United States Patent
Chae et al.

(10) Patent No.: US 11,999,624 B2
(45) Date of Patent: Jun. 4, 2024

(54) YOLK-SHELL STRUCTURED PARTICLES, METHOD FOR PRODUCING SAME, AND LITHIUM SECONDARY BATTERY COMPRISING SAME

(71) Applicants: LG CHEM, LTD., Seoul (KR); INDUSTRY-UNIVERSITY COOPERATION FOUNDATION HANYANG UNIVERSITY ERICA CAMPUS, Ansan-si (KR)

(72) Inventors: Jonghyun Chae, Daejeon (KR); Won Cheol Yoo, Yongin-si (KR); Min Seo Kim, Daejeon (KR); Jangbae Kim, Daejeon (KR); Min Seok Kang, Seongnam-si (KR)

(73) Assignees: LG ENERGY SOLUTION, LTD., Seoul (KR); INDUSTRY-UNIVERSITY COOPERATION FOUNDATION HANYANG UNIVERSITY ERICA CAMPUS, Ansan-si (KR)

( * ) Notice: Subject to any disclaimer, the term of this patent is extended or adjusted under 35 U.S.C. 154(b) by 129 days.

(21) Appl. No.: 16/644,021

(22) PCT Filed: Sep. 21, 2018

(86) PCT No.: PCT/KR2018/011233
§ 371 (c)(1),
(2) Date: Mar. 3, 2020

(87) PCT Pub. No.: WO2019/066402
PCT Pub. Date: Apr. 4, 2019

(65) Prior Publication Data
US 2021/0024358 A1  Jan. 28, 2021

(30) Foreign Application Priority Data

Sep. 29, 2017 (KR) .................. 10-2017-0127273
Sep. 29, 2017 (KR) .................. 10-2017-0127292

(51) Int. Cl.
*H01M 4/1395* (2010.01)
*C01B 32/05* (2017.01)
(Continued)

(52) U.S. Cl.
CPC ............ *C01B 33/023* (2013.01); *C01B 32/05* (2017.08); *H01M 4/133* (2013.01);
(Continued)

(58) Field of Classification Search
None
See application file for complete search history.

(56) References Cited

U.S. PATENT DOCUMENTS

2009/0029256 A1  1/2009  Mah et al.
2012/0100438 A1  4/2012  Fasching et al.
(Continued)

FOREIGN PATENT DOCUMENTS

CN  101339987 A  1/2009
CN  103238238 A  8/2013
(Continued)

OTHER PUBLICATIONS

English translation of CN 103531760) (Year: 2012).*
(Continued)

*Primary Examiner* — Yoshitoshi Takeuchi
(74) *Attorney, Agent, or Firm* — Birch, Stewart, Kolasch & Birch, LLP

(57) ABSTRACT

A particle with a yolk-shell structure including a shell including carbon; and a care including silicon (Si) provided inside the shell, wherein at least a part of the shell is spaced (Continued)

apart from the core, and the particle with the yolk-shell structure has a micropore volume of 0.15 cm$^3$/g or less, and a method for preparing the same.

7 Claims, 13 Drawing Sheets

(51) Int. Cl.
  *C01B 33/023* (2006.01)
  *H01M 4/133* (2010.01)
  *H01M 4/134* (2010.01)
  *H01M 4/1393* (2010.01)
  *H01M 4/36* (2006.01)
  *H01M 10/0525* (2010.01)
  *H01M 4/02* (2006.01)

(52) U.S. Cl.
  CPC ....... *H01M 4/1393* (2013.01); *H01M 4/1395* (2013.01); *H01M 4/366* (2013.01); *H01M 10/0525* (2013.01); *H01M 2004/027* (2013.01); *H01M 2004/028* (2013.01)

(56) References Cited

U.S. PATENT DOCUMENTS

| | | |
|---|---|---|
| 2015/0099187 A1 | 4/2015 | Cui et al. |
| 2017/0117538 A1 | 4/2017 | Bendimerad et al. |
| 2018/0297849 A1 | 10/2018 | Liu et al. |
| 2018/0342732 A1 | 11/2018 | Troegel et al. |
| 2021/0024358 A1 | 1/2021 | Chae et al. |

FOREIGN PATENT DOCUMENTS

| | | | | |
|---|---|---|---|---|
| CN | 103531760 | * | 1/2014 | ............ B82Y 30/00 |
| CN | 103531760 A | | 1/2014 | |
| CN | 105006559 A | | 10/2015 | |
| CN | 106920949 A | | 7/2017 | |
| JP | 2009-32693 A | | 2/2009 | |
| JP | 2013-182706 A | | 9/2013 | |
| JP | 2020-520881 A | | 7/2020 | |
| KR | 10-2017-0089043 A | | 8/2017 | |
| WO | WO 2017/083804 A1 | | 5/2017 | |
| WO | WO 2017/140842 A1 | | 8/2017 | |

OTHER PUBLICATIONS

English translation of CN 103531760 (Year: 2014).*
Ahn et al., Elucidating Relationships between Structural Properties of Nanoporous Carbonaceous Shells and Electrochemical Performances of Si@Carbon Anodes for Lithium-Ion Batteries, 119 J. of Phys. Chem. 10255-65 (2015) (Year: 2015).*
Yang et al., Yolk-shell silicon-mesoporous carbon anode with compact solid electrolyte interphase film for superior lithium-ion batteries, vol. 18 (Nano Energy) 133-142 (Nov. 2015) (Year: 2015).*
Extended European Search Report, dated Jul. 27, 2020, for European Application No. 18862954.7.
Malvern Instruments Worldwide, "A Basic Guide to Particle Characterization, " White Paper, May 2, 2012, pp. 1-26, XP055089322.
Xiao, et al., "Regulated Breathing Effect of Silicon Negative Electrode for Dramatically Enhanced Performance of Li-ion Battery," Advanced Functional Materials, vol. 25, No. 9, 2015 (Mar. 4, 2015), pp. 1426-1433, XP001595306.
European Office Action for Europe App 18 862 954.7, dated Feb. 22, 2022.
Ahn et al., "Elucidating Relationships between Structural Properties of Nanoporous Carbonaceous Shells and Electrochemical Performances of Si@Carbon Anodes for Lithium-Ion Batteries", The Journal of Physical Chemistry C, 2015, vol. 119, No. 19, pp. 10255-10265, Total 37 pages.
International Search Report (PCT/ISA/210) issued in PCT/KR2018/011233, mailed on Feb. 28, 2019.
Jung et al., "Electrochemical Performance of Hollow Silicon/Carbon Anode Materials for Lithium Ion Battery", Appl. Chem. Eng., Aug. 2016, vol. 27, No. 4, pp. 444-448.
Li et al., "A novel approach to prepare Si/C nanocomposites with yolk-shell structures for lithium ion batteries", RSC Adv., 2014, vol. 4, pp. 36218-36225.
Li et al., "Mesoporous silicon/carbon hybrids with ordered pore channel retention and tunable carbon incorporated content as high performance anode materials for lithium-ion batteries", Energy 85, 2015, pp. 159-166.
Luo et al., "Critical Thickness of Phenolic Resin-Based Carbon Interfacial Layer for Improving Long Cycling Stability of Silicon Nanoparticle Anodes", Nano Energy, Sep. 2016, vol. 27, pp. 255-264. Total 25 Pages.
Ma et al., "Facile synthesis of Si-C nanocomposites with yolk-shell structure as an anode for lithium-ion batteries". Journal of Alloys and Compounds 2017, vol. 704, pp. 599-606.
Xu et al., "Nanosized core/shell silicon@carbon anode material for lithium ion batteries with polyvinylidene fluoride as carbon source", J. Mater. Chem., 2010, vol. 20, pp. 3216-3220.
Yang, et al., "Yolk-shell silicon-mesoporous carbon anode with compact solid electrolyte interphase film for superior lithium-ion batteries", Nano Energy, 2015, vol. 18, pp. 133-142.
Chen et al., "Reversible Lithium-Ion Storage in Silver-Treated Nanoscale Hollow Porous Silicon Particles," Agnew. Chem. Int. Ed., vol. 51, 2012, pp. 2409-2413.
Yang et al., "Yolk-Shell Silicon-Mesoporous Carbon Anode with Compact Solid Electrolyte Interphase Film for Superior Lithium-Ion Batteries," Supporting Information, Nano Energy, vol. 18, Oct. 24, 2015, 10 pages.

* cited by examiner

[Figure 1]
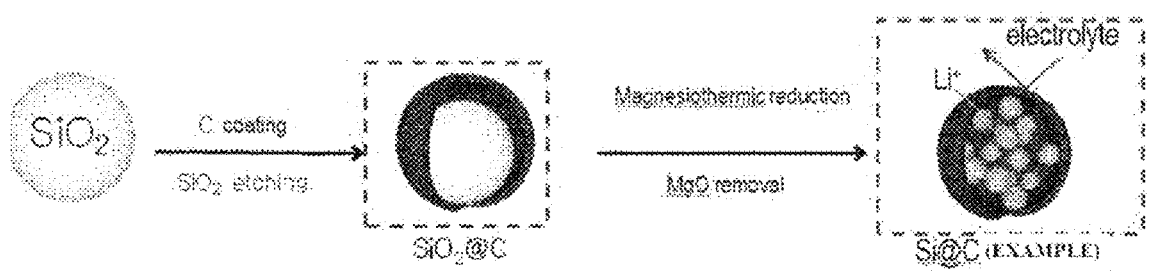
[Figure 2] - Prior Art
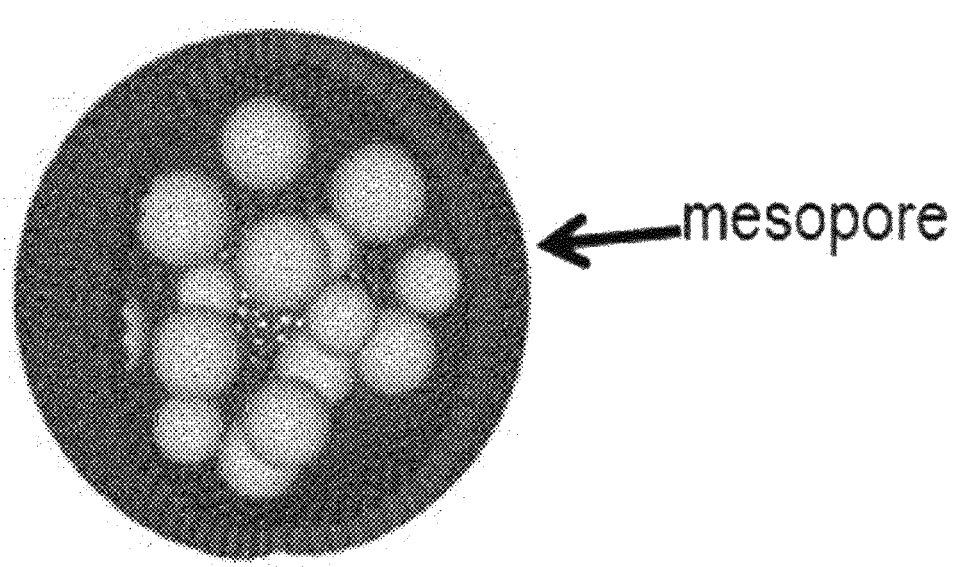

[Figure 3]
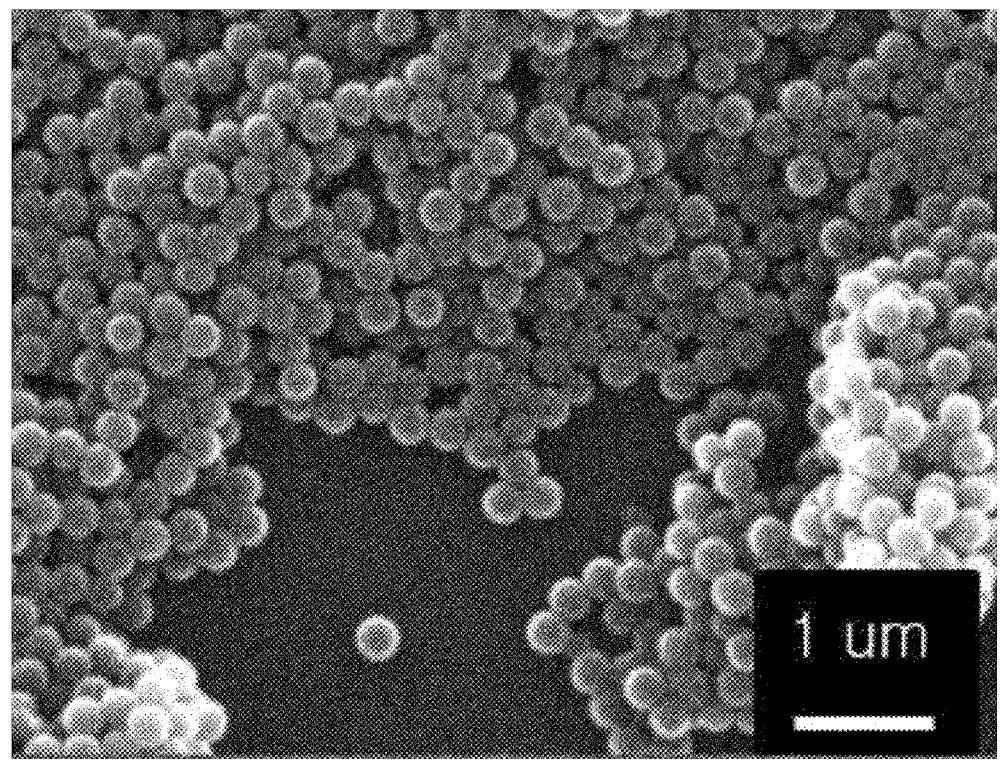
[Figure 4]
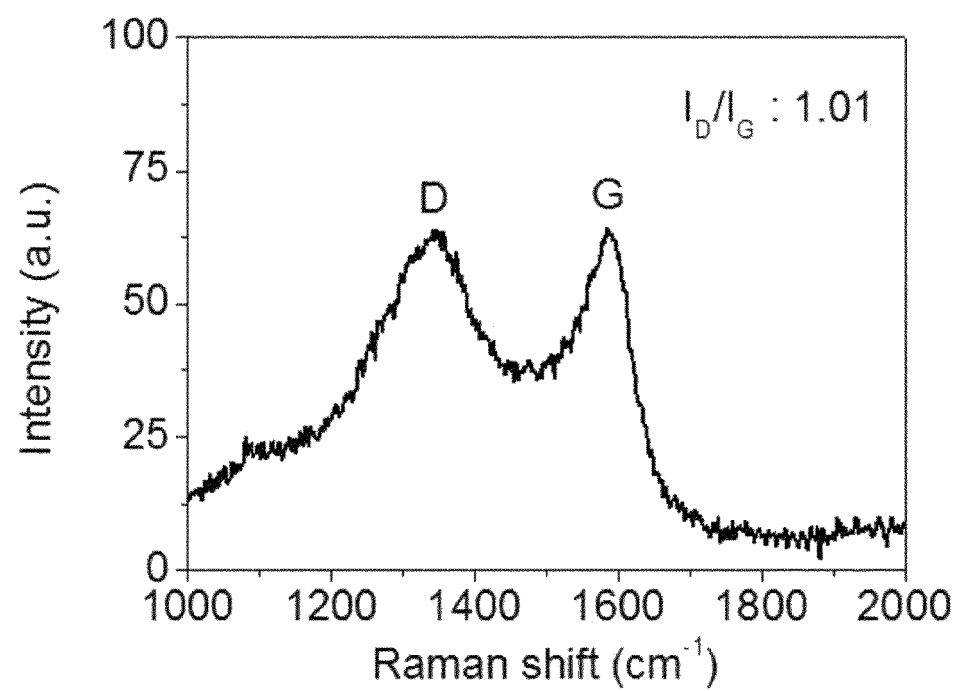

【Figure 5】
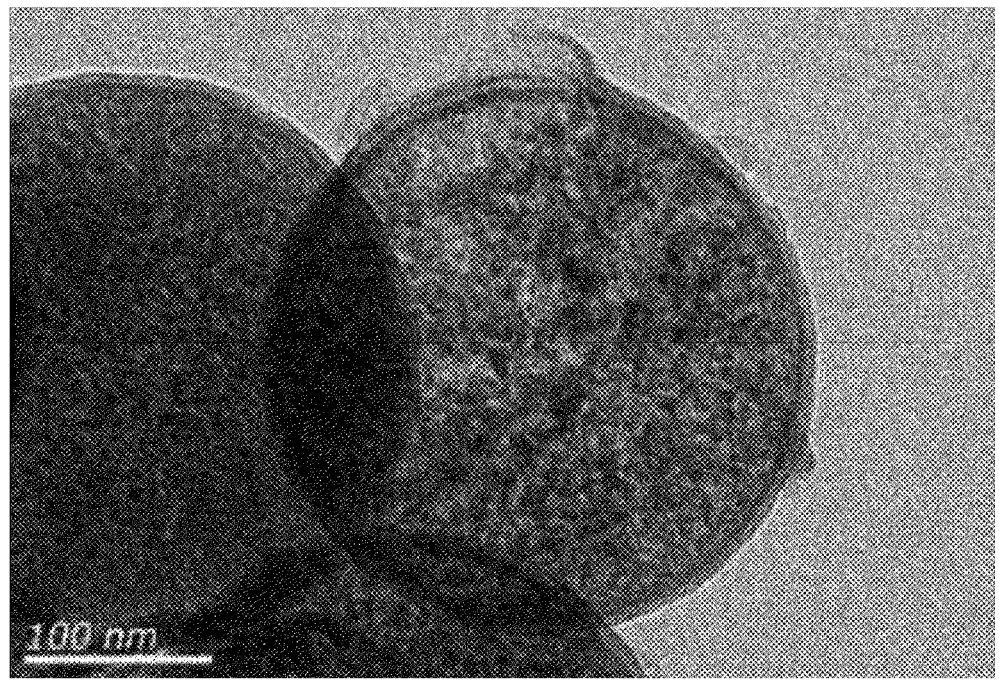
【Figure 6】
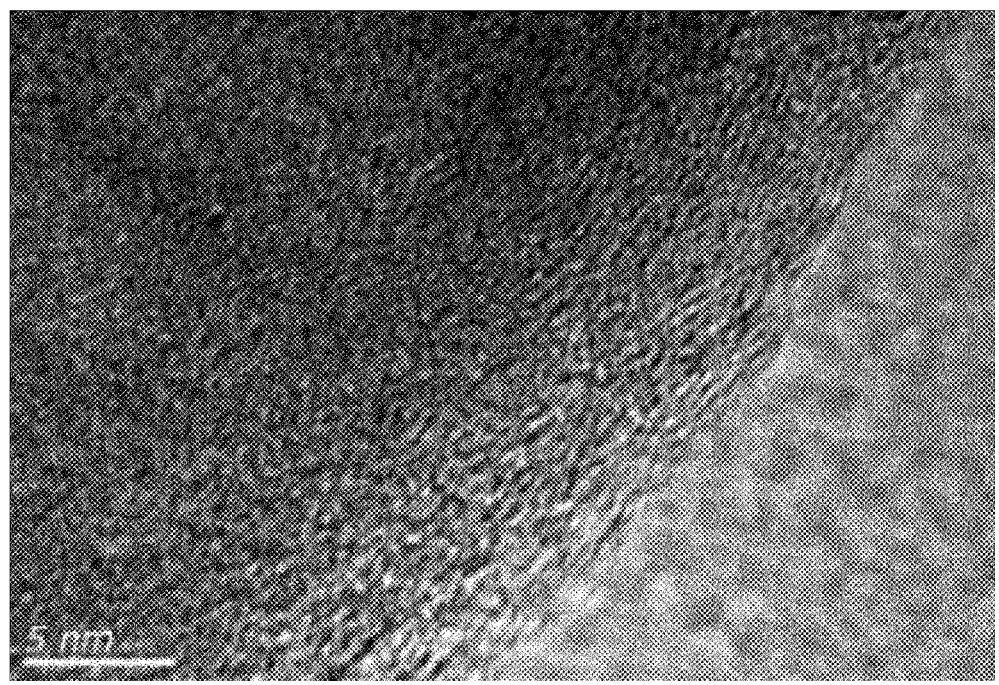

【Figure 7】
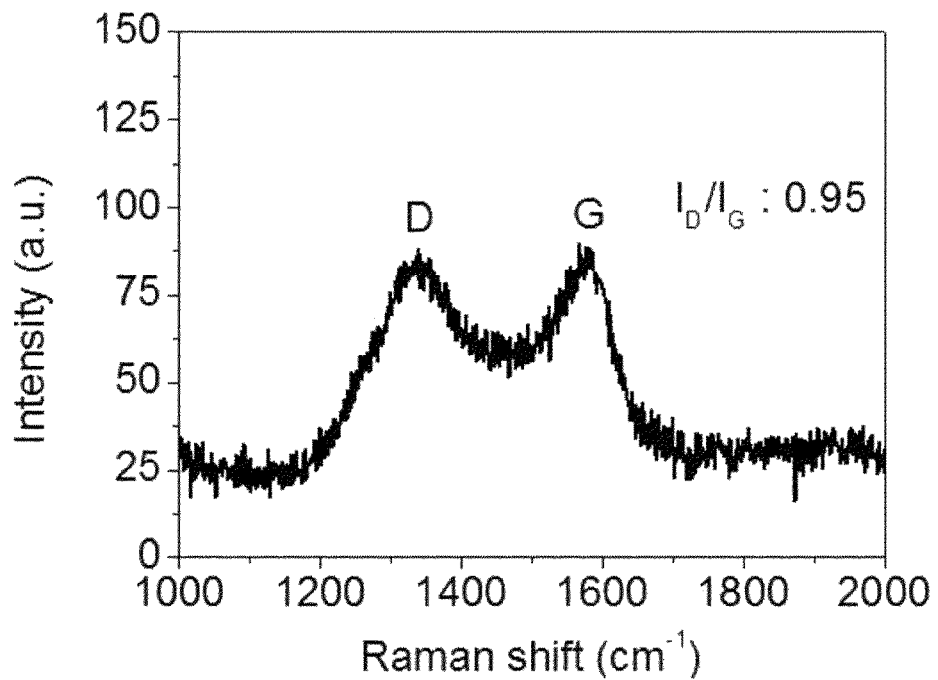
【Figure 8】
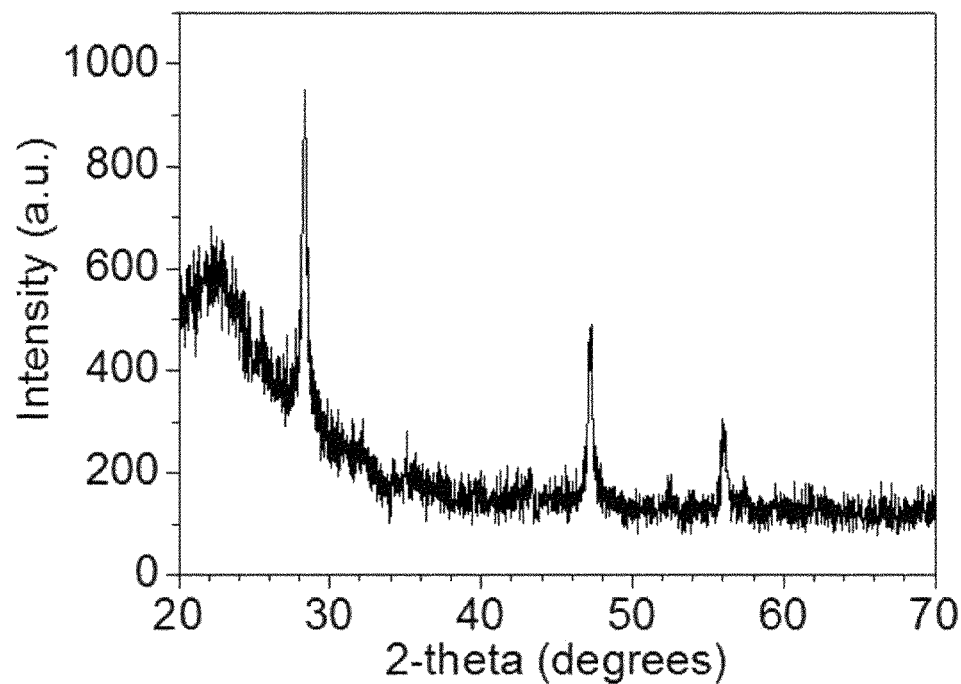

[Figure 9]
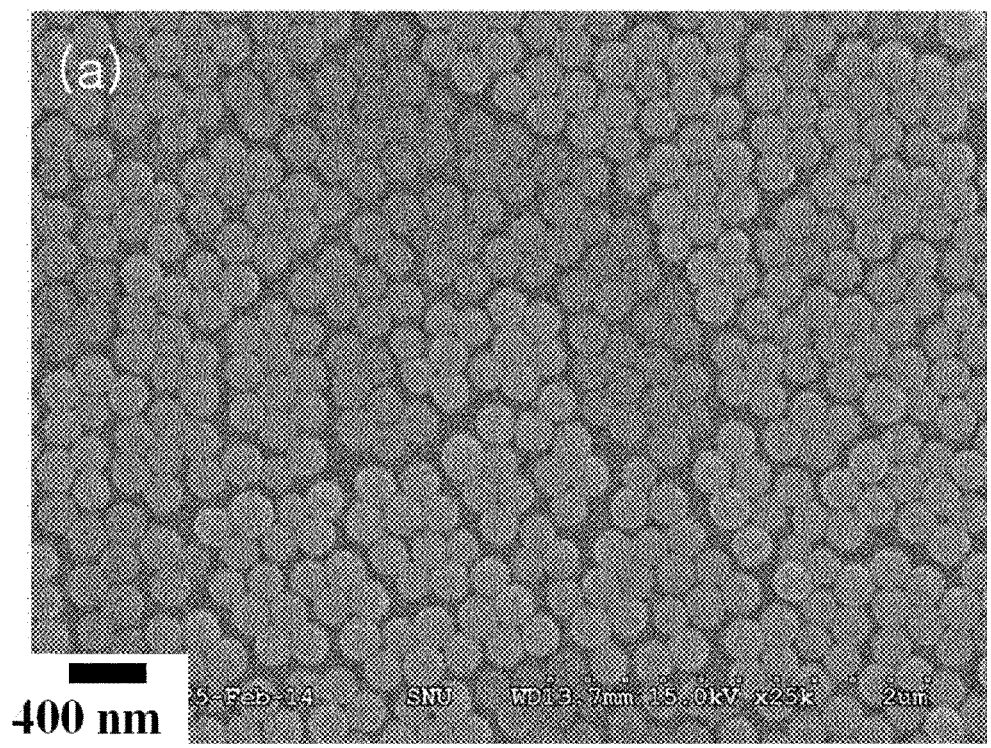

[Figure 10]
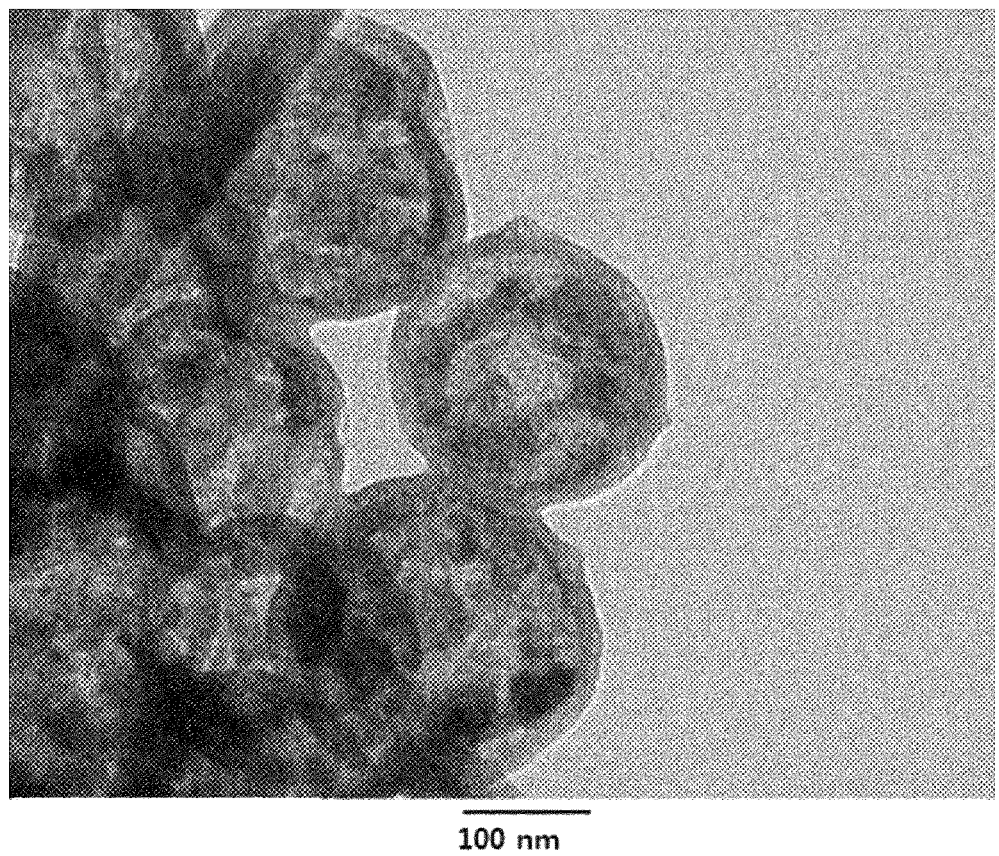
100 nm

[Figure 11]
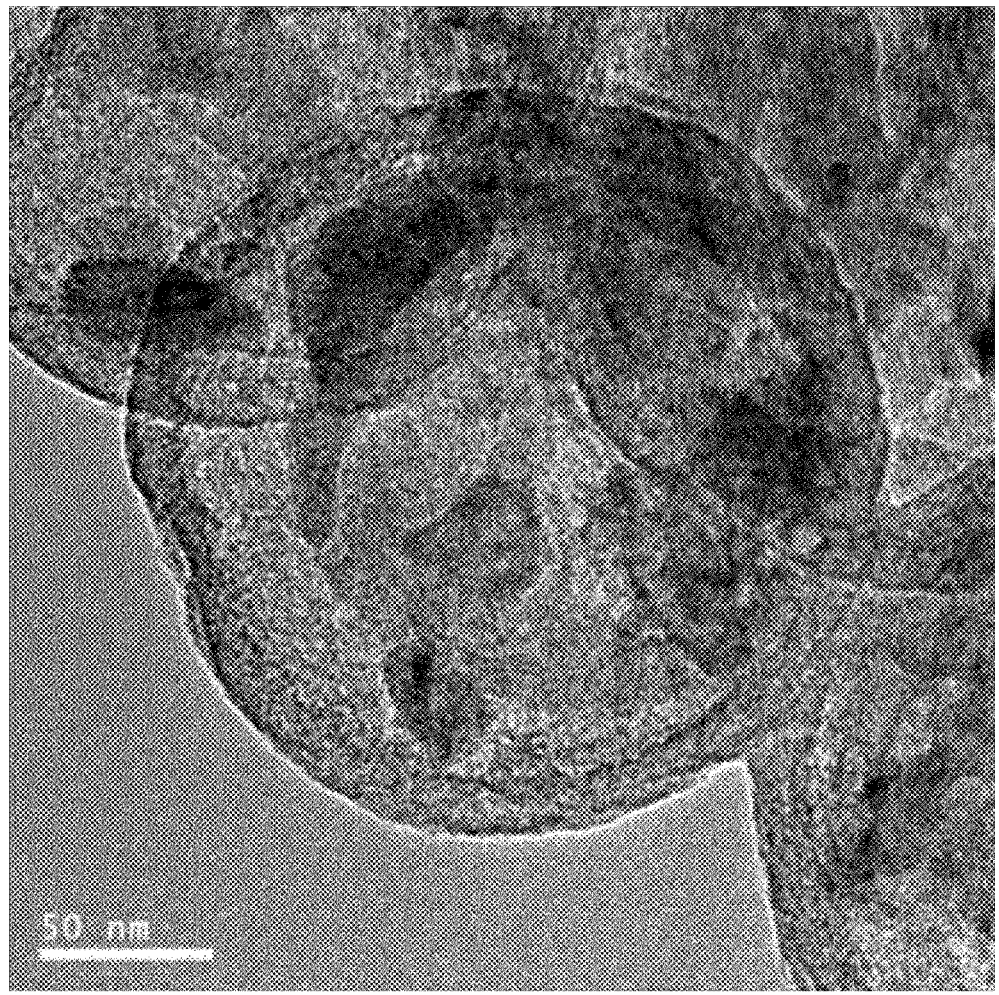

[Figure 12]
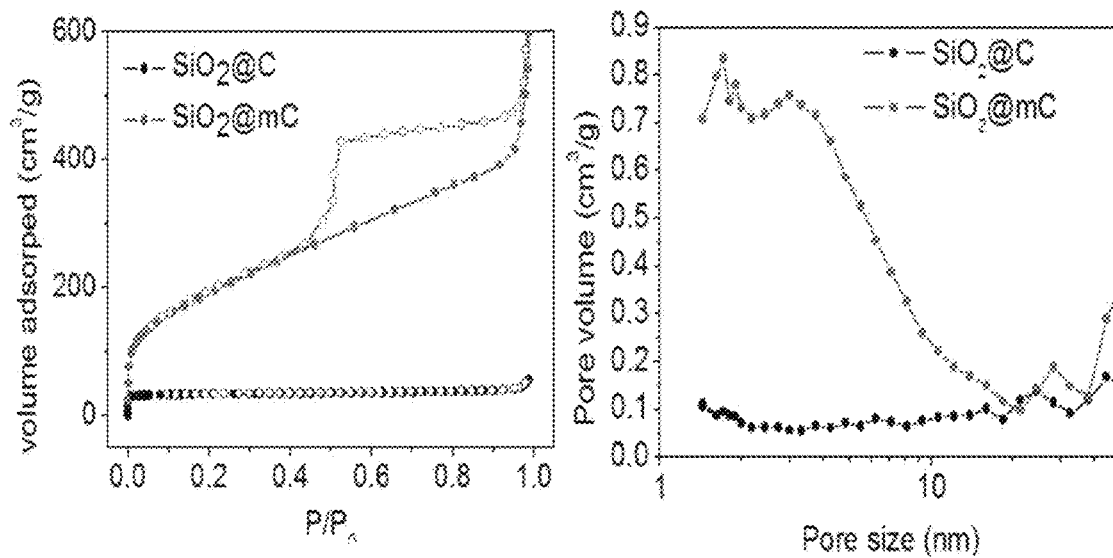
[Figure 13]
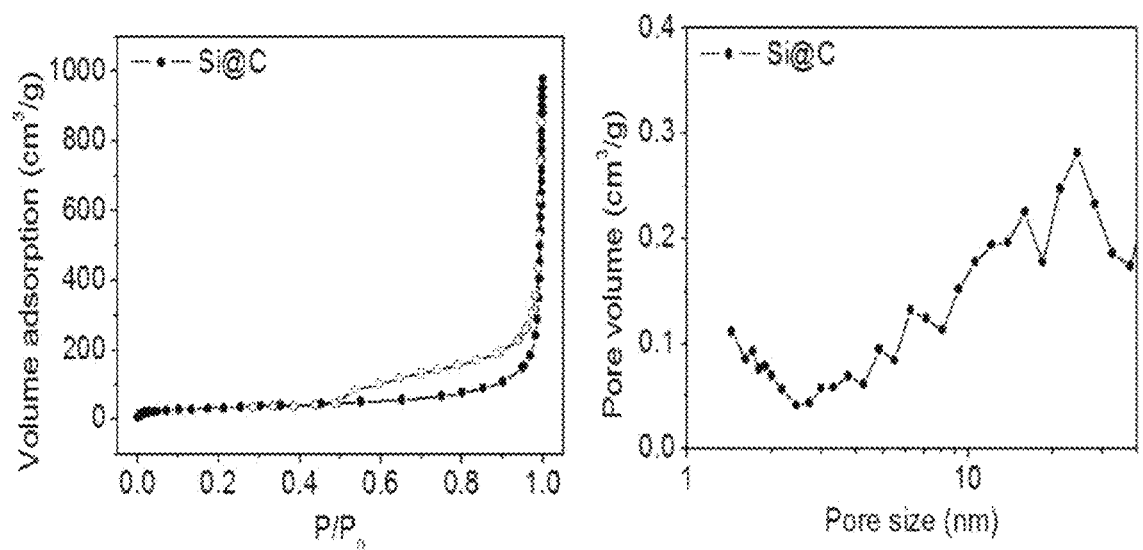

[Figure 14]
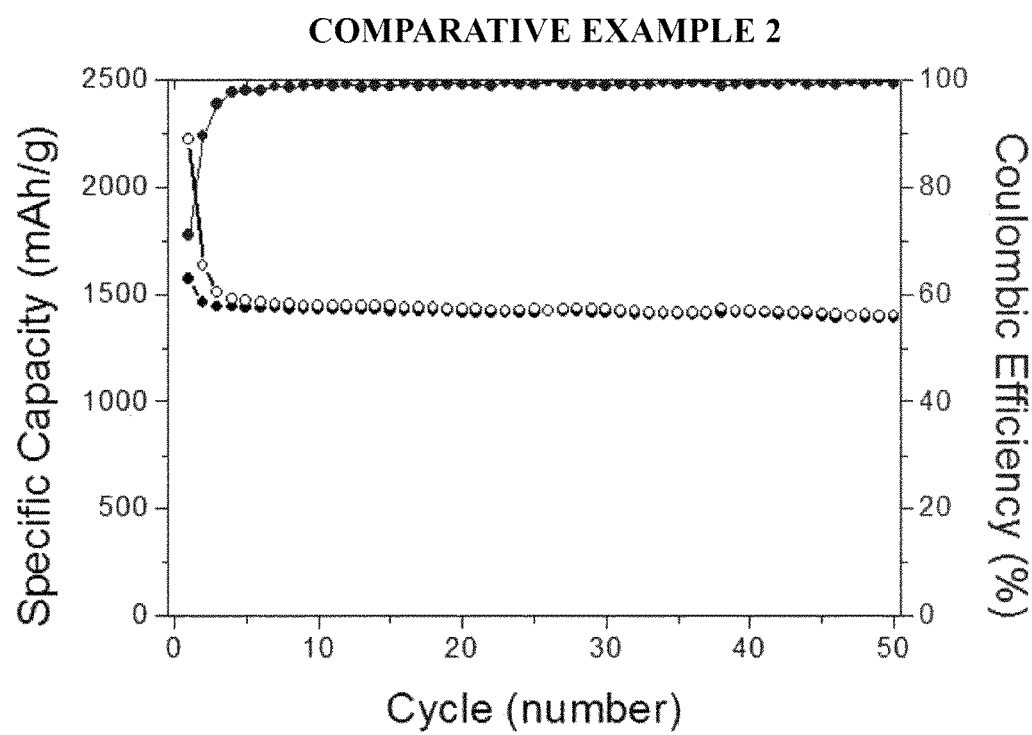

【Figure 15】
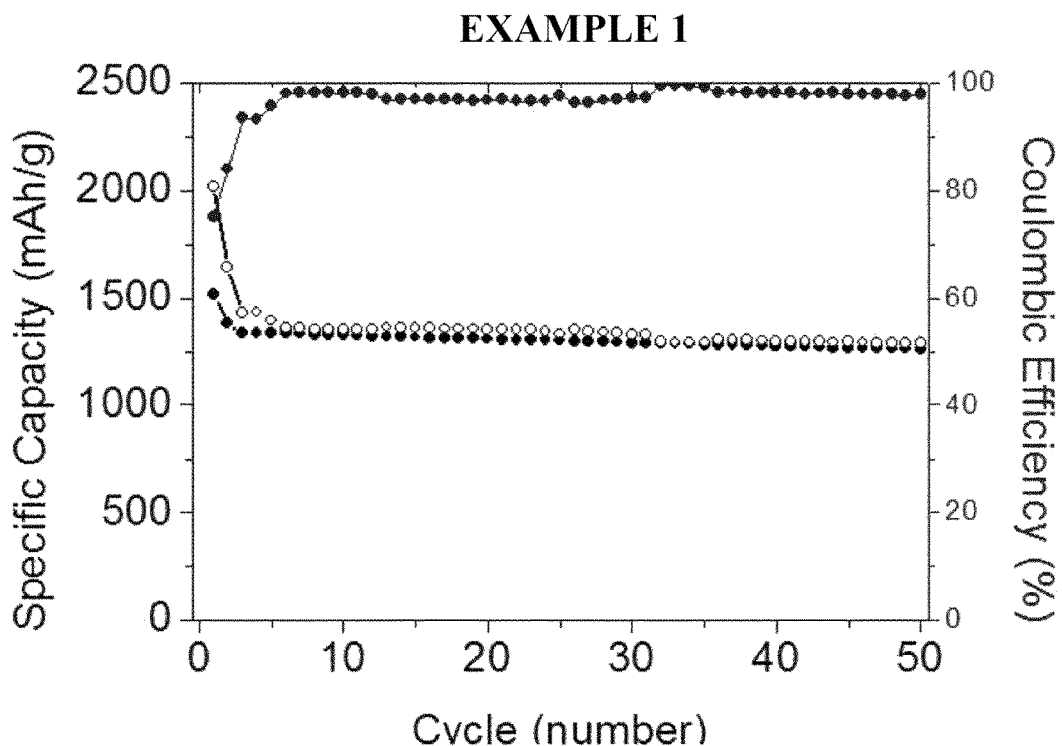
【Figure 16】
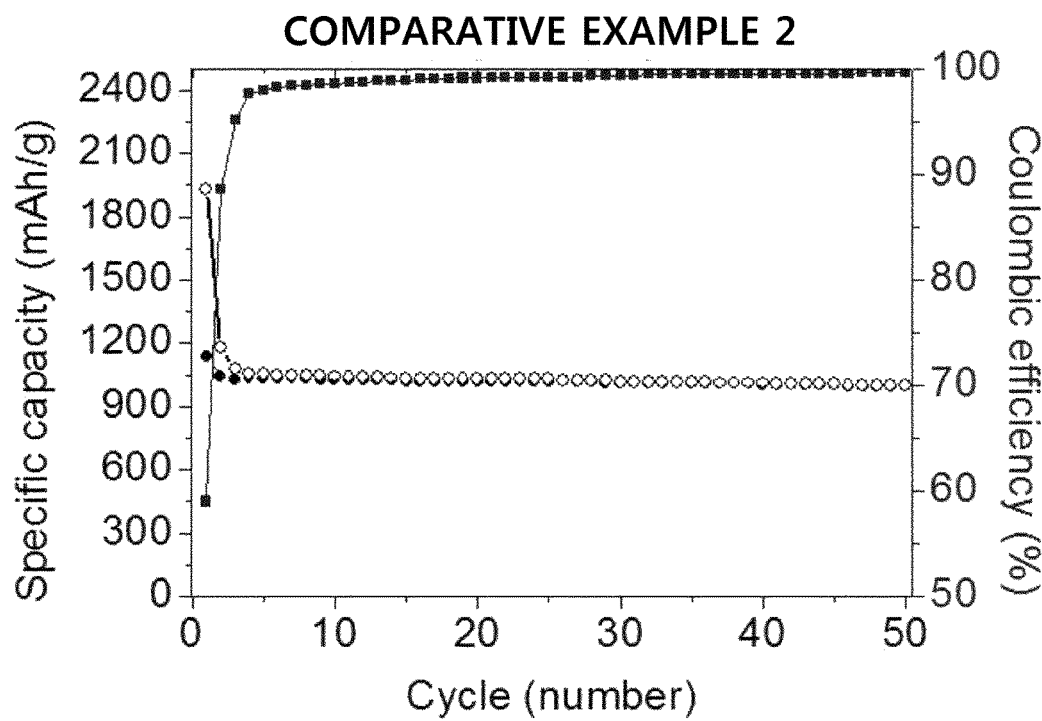

【Figure 17】
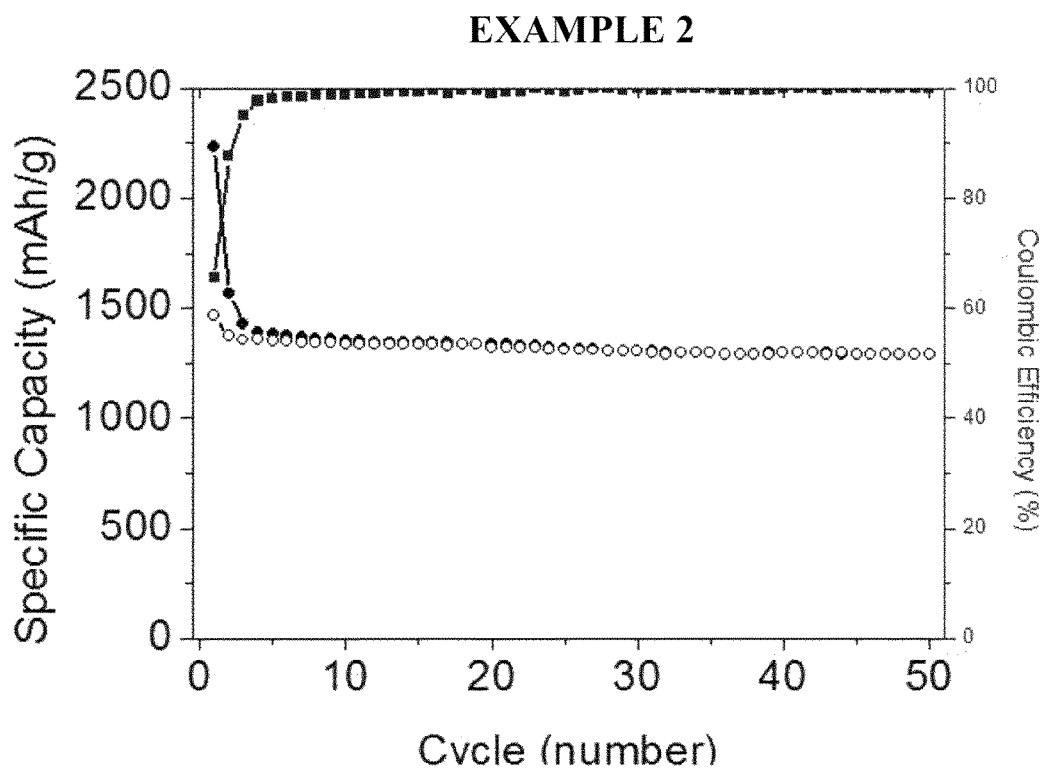
【Figure 18】
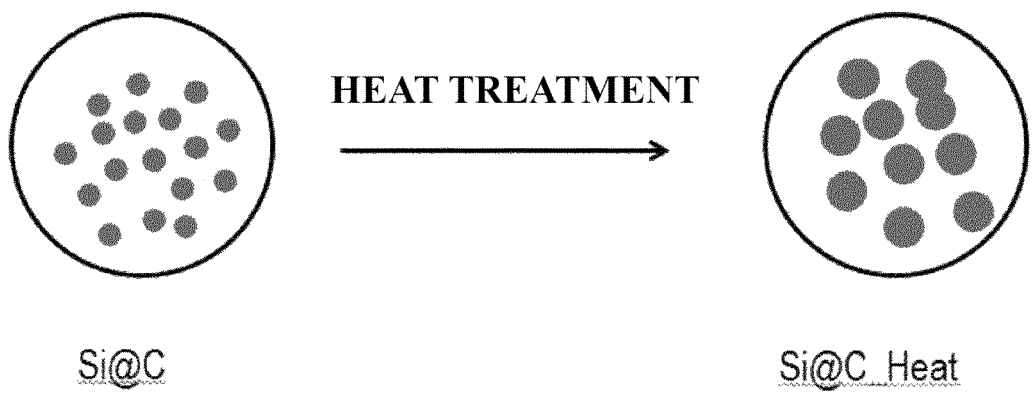

【Figure 19】
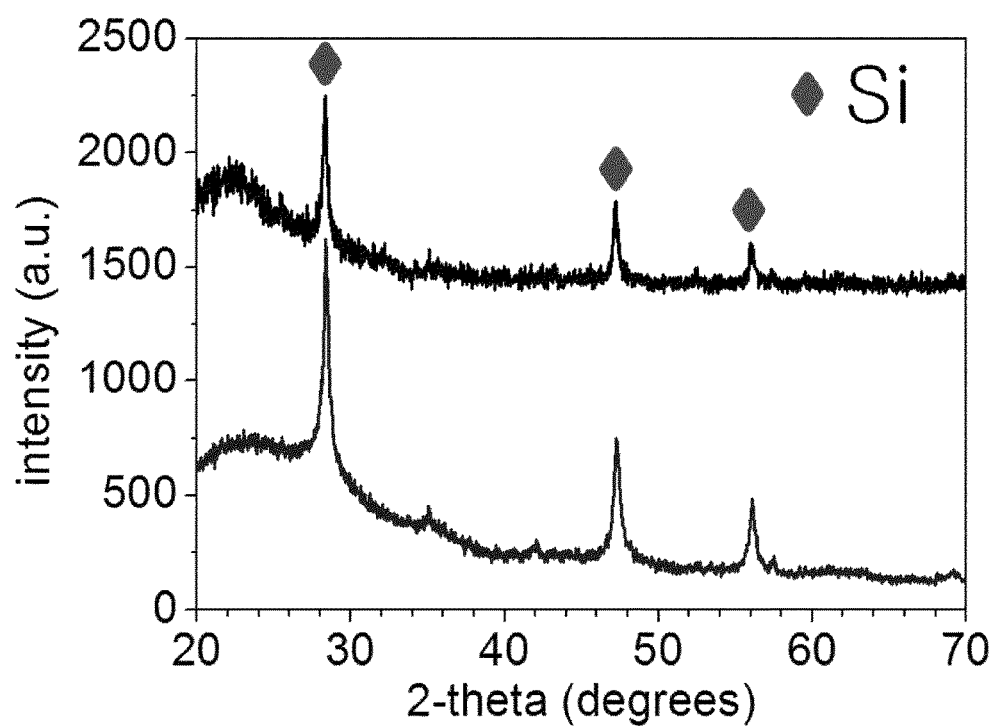

【Figure 20】
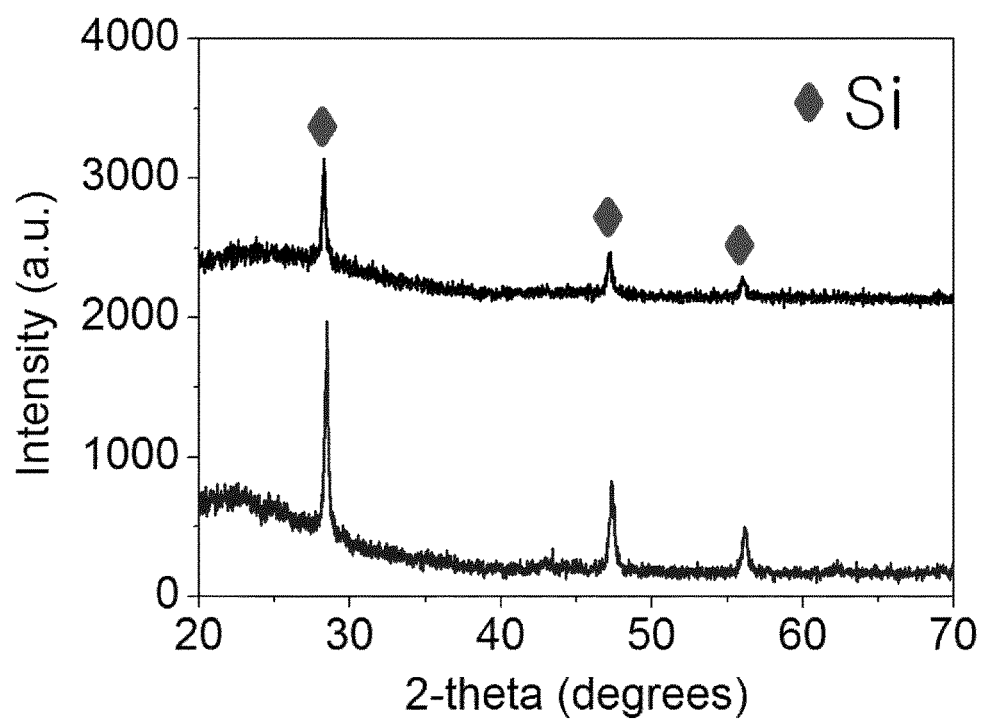

YOLK-SHELL STRUCTURED PARTICLES, METHOD FOR PRODUCING SAME, AND LITHIUM SECONDARY BATTERY COMPRISING SAME

TECHNICAL FIELD

This application claims priority to and the benefits of Korean Patent Application No. 10-2017-0127292, filed with the Korean Intellectual Property Office on Sep. 29, 2017, and Korean Patent Application No. 10-2017-0127273, filed with the Korean Intellectual Property Office on Sep. 29, 2017, the entire contents of which are incorporated herein by reference.

The present invention relates to a particle with a yolk-shell structure, a method for preparing the same, and a lithium secondary battery including the same.

BACKGROUND ART

Interests in energy storage technologies have been increasingly growing recently. As applications have expanded to energy of mobile phones, camcorders and notebook PCs, and furthermore, to electric vehicles, efforts on the research and development of electrochemical devices have been more and more materialized.

Electrochemical devices are fields receiving most attention in such aspects and among these, development of secondary batteries capable of charge and discharge have been the focus of attention, and developing such batteries has been progressed to research and development on the design of new electrodes and batteries for enhancing capacity density and specific energy.

Among currently used secondary batteries, lithium secondary batteries developed in early 1990s have received attention with advantages of having high operating voltage and significantly higher energy density compared to conventional batteries such as Ni-MH, Ni—Cd and sulfuric acid-lead batteries using an aqueous solution liquid electrolyte.

Among these, graphite used as an existing lithium ion battery negative electrode material has its capacity (372 mAh/g at 25° C.) reaching a limit, and accordingly, needs for development on silicon having higher theoretical capacity compared to graphite (3580 mAh/g at 25° C.) has been presented.

Such silicon has low electrical conductivity, and has its volume expanded by approximately 300% by an alloying reaction occurring when charging and discharging with lithium. When such a continuous volume expansion occurs, a SEI layer inevitably produced at an interface between an electrolyte and an electrode is continuously produced causing a problem of being fatal on battery long lifetime properties.

In addition, in a commercialization stage, such silicon has had a problem of having low first cycle Coulombic efficiency (C: ~90%, Si: ~60%) compared to graphite, and there have been needs for improvements since performance has been poor when used in actual batteries.

In view of the above, existing technologies such as "J. Phys. Chem. C 2015, 119, 10255" have used a silicon-carbon composite with a yolk-shell structure having 2 nm to 3 nm mesopores as a negative electrode material of a lithium secondary battery, however, there have been needs for improvements since performance has been poor when used in actual batteries.

PRIOR ART DOCUMENTS (Non-Patent Document 1) "Elucidating Relationships between Structural Properties of Nanoporous Carbonaceous Shells and Electrochemical Performances of Si@Carbon Anodes for Lithium-Ion Batteries", Jihoon Ahn, Kyung Jae Lee, Woojeong Bak, Jung-Joon Kim, Jin-Kyu Lee, Won Cheol Yoo, and Yung-Eun Sung, "J. Phys. Chem. C, 2015, 119 (19), pp 10255-10265"

DISCLOSURE

Technical Problem

In existing technologies, a carbon shell in a carbon composite structure included in a negative electrode material is formed with carbon having meso-pores, and an electrolyte readily penetrates through the mesopores causing side reactions on a silicon (Si) particle surface inside the shell of the negative electrode material, which results in a decrease in initial efficiency and Coulombic efficiency.

As a result of extensive studies in view of the above, the inventors of the present invention have identified that a silicon negative electrode material with a yolk-shell structure having increased initial efficiency and excellent rate-limiting property while having a volume expansion buffer structure and having an electrolyte penetration reducing effect may be developed by reducing a pore size on a carbon shell surface, partially etching silica inside the particle, and then magnesiothermic reducing the result.

Accordingly, an aspect of the present invention provides a particle with a yolk-shell structure having an effect of reducing electrolyte penetration when used in a battery, and thereby having increased initial efficiency, excellent rate-limiting property and cycle stability, and a method for preparing the same.

In addition, in existing technologies, a negative electrode material using silicon has a problem of having low first cycle Coulombic efficiency compared to graphite.

As a result of extensive studies in view of the above, the inventors of the present invention have identified that a silicon negative electrode material with a yolk-shell structure having excellent long-term stability, increased 1st CE value, capable of controlling a rate of change in the electrode thickness, and having increased initial efficiency and excellent rate-limiting property may be developed through controlling a Si particle size inside a carbon shell through high temperature heat treatment.

Accordingly, another aspect of the present invention provides a particle with a yolk-shell structure having increased first cycle Coulombic efficiency, and having excellent rate-limiting property and cycle stability, and a method for preparing the same.

Technical Solution

According to an aspect of the present invention, there is provided a particle with a yolk-shell structure including a carbon shell; and a silicon (Si) core provided inside the carbon shell, wherein at least a part of the shell is spaced apart from the core, and the particle with a yolk-shell structure has a micropore particle volume of 0.15 $cm^3$/g or less.

According to another aspect of the present invention, there is provided a particle with a yolk-shell structure including a carbon shell; and a silicon (Si) core provided inside the carbon shell, wherein at least a part of the shell is spaced apart from the core, and a silicon (Si) particle inside the core has a size of 20 nm or greater.

According to another aspect of the present invention, there is provided a method for preparing a particle with a yolk-shell structure including (a) preparing a silica-carbon core-shell particle by forming a carbon shell on silica (SiO$_2$); (b) reducing a pore size of the carbon shell of the particle formed in (a); (c) partially etching the silica (SiO$_2$) inside the particle having its pore size reduced in (b); and (d) preparing a particle with a yolk-shell structure through magnesiothermic reduction.

According to another aspect of the present invention, there is provided a negative electrode for a lithium secondary battery including the particle with a yolk-shell structure.

According to another aspect of the present invention, there is provided a lithium secondary battery including the negative electrode; a positive electrode; and an electrolyte.

Advantageous Effects

According to the present invention, a volume expansion buffer structure can be obtained by synthesizing a Si@C composite with a yolk-shell structure using a magnesium reaction. In addition, porosity of a carbon material forming the shell after the magnesium reaction can be reduced, and a degree of graphitization can be enhanced. Such a pore reduction in the carbon is effective in reducing electrolyte penetration when used in a battery, and accordingly, advantages of having increased initial efficiency, excellent rate-limiting property and cycle stability are obtained.

In addition, according to the present invention, by heat treating the Si@C composite with the yolk-shell structure, an advantage of obtaining a negative electrode having excellent long-term stability, increased 1st CE value, capable of controlling a rate of change in the electrode thickness, and having increased initial efficiency and excellent rate-limiting property can be provided.

DESCRIPTION OF DRAWINGS

FIG. 1 is a mimetic diagram illustrating a process for preparing a particle with a yolk-shell structure according to an embodiment of the present invention.

FIG. 2 is a mimetic diagram illustrating a particle with a yolk-shell structure according to an existing technology.

FIG. 3 is a SEM image photographing SiO$_2$ prepared in Example 1 of present invention.

FIG. 4 is a graph showing a result of Raman pattern analysis on a SiO$_2$@C composite prepared in Example 1 of the present invention.

FIG. 5 and FIG. 6 are TEM images photographing a Si@C composite prepared in Example 1 of the present invention.

FIG. 7 is a graph showing a result of Raman pattern analysis on a Si@C composite prepared in Example 1 of the present invention.

FIG. 8 is a graph showing a result of XRD analysis on a Si@C composite prepared in Example 1 of the present invention.

FIG. 9 is a SEM image photographing SiO$_2$ prepared in Comparative Example 1 of present invention.

FIG. 10 and FIG. 11 are TEM images photographing Si@mC prepared in comparative examples of the present invention.

FIG. 12 is a SEM image photographing SiO$_2$ prepared in Example 2 of present invention.

FIG. 13 is a TEM image photographing a Si@mC composite prepared in Example 2 of the present invention.

FIG. 14 is a graph showing results of capacity property and rate-limiting property experiments according to Comparative Example 2 of the present invention.

FIG. 15 is a graph showing results of capacity property and rate-limiting property experiments according to Example 1 of the present invention.

FIG. 16 is a graph showing results of capacity property and rate-limiting property experiments according to Comparative Example 3 of the present invention.

FIG. 17 is a graph showing results of capacity property and rate-limiting property experiments according to Example 2 of the present invention.

FIG. 18 is a mimetic diagram illustrating a heat treatment process of the present invention.

FIG. 19 is a graph showing changes in the XRD measurement results of Comparative Example 1 and Example 1 of the present invention.

FIG. 20 is a graph showing changes in the XRD measurement results of Comparative Example 2 and Example 2 of the present invention.

BEST MODE

Hereinafter, the present invention will be described in detail with reference to accompanying drawings so that those skilled in the art may readily implement the present invention. However, the present invention may be implemented in various different forms, and is not limited to the present specification.

In the drawings, parts not relevant to the descriptions are not included in order to clearly describe the present invention, and like reference numerals are used for like elements throughout the specification. In addition, sizes and relative sizes of constituents presented in the drawings are unrelated to actual scales, and may be reduced or exaggerated for clarity of the descriptions.

Particle with Yolk-Shell Structure

A particle with a yolk-shell structure of the present invention includes a shell including carbon; and a silicon (Si) containing core provided inside the shell.

In the present invention, the structure of the yolk-shell particle means, as a term derived from an egg, a structure having empty space between the core and the shell as an egg has a structure in the order of a yolk, a white and a shell. For this, at least a part of the shell of the particle with a yolk-shell structure of the present invention is spaced apart from the core.

In the present invention, the yolk-shell particle may be prepared through a process as in FIG. 1, and this will be examined in detail in a method for preparing a yolk-shell particle to describe later.

In the particle with a yolk-shell structure of the present invention, the particle with a yolk-shell structure may have a micropore particle volume of 0.15 cm$^3$/g or less, preferably 0.05 cm$^3$/g or less, more preferably 0.03 cm$^3$/g or less, and most preferably 0.001 cm$^3$/g or less. When the particle with a yolk-shell structure has a micropore particle volume of greater than 0.15 cm$^3$/g, an electrolyte liquid readily penetrates causing a problem of decreasing capacity retention rate and first cycle Coulombic efficiency when used in a battery.

In the particle with a yolk-shell structure of the present invention, the pore volume may be measured using common methods used in the industry, and may preferably be measured using BEL mini equipment of BEL.

In the particle with a yolk-shell structure of the present invention, the particle with a yolk-shell structure may have a specific surface area of 600 $m^2/g$ or less, preferably 50 $m^2/g$ to 600 $m^2/g$, and most preferably 50 $m^2/g$ to 120 $m^2/g$. When the specific surface area range is greater than 600 $m^2/g$, a contact surface with an electrolyte increases increasing probability of causing side reactions with the electrolyte, which causes a problem of decreasing initial efficiency.

In addition, in the particle with a yolk-shell structure of the present invention, the carbon shell may have a mesopore size of 2 nm or less. The mesopore size being greater than 2 nm may cause a problem of decreasing capacity retention rate and first cycle Coulombic efficiency when used in a battery since an electrolyte liquid readily penetrates.

In addition, the yolk-shell particle may be prepared through, after going through a process as in FIG. 1, a process as in FIG. 18 in the present invention, and the process will be examined in detail in a method for preparing a yolk-shell particle to describe later.

When prepared as above, the size of the silicon (Si) particle in the core provided inside the carbon shell may be 20 nm or greater, preferably from 30 nm to 150 nm, and more preferably from 30 nm to 100 nm in the particle with a yolk-shell structure of the present invention. The silicon particle size being less than 20 nm may cause a problem of decreasing first cycle Coulombic efficiency as the specific surface area increases.

When prepared as above, the particle with a yolk-shell structure of the present invention may have a specific surface area of 150 $m^2/g$ or less, preferably 100 $m^2/g$ or less, and most preferably 30 $m^2/g$ to 100 $m^2/g$. When the specific surface area increases, a contact area with an electrolyte increases increasing probability of causing side reactions with the electrolyte, which causes a problem of decreasing initial efficiency.

Method for Preparing Particle with Yolk-Shell Structure

The particle with a yolk-shell structure of the present invention is prepared through (a) preparing a silica-carbon core-shell particle by forming a shell including carbon on silica ($SiO_2$); (b) reducing a pore size of the shell of the particle formed in (a); (c) partially etching the silica ($SiO_2$) inside the particle having pore size reduced in (b); and (d) preparing a particle with a yolk-shell structure through magnesiothermic reduction, and this may be schematically illustrated through FIG. 1.

In addition, after d), e) growing a size of a silicon (Si) particle inside the core through heat treating the particle with a yolk-shell structure magnesiothermic reduced in (d) may be further performed in the preparation, and this may be schematically illustrated through FIG. 18.

First, the method for preparing a particle with a yolk-shell structure of the present invention includes (a) preparing a silica-carbon core-shell particle by forming a carbon shell on silica ($SiO_2$).

Silica used in (a) is not particularly limited, but preferably, target size $SiO_2$ is synthesized using a Stober preparation method commonly used in the industry, and preferably, silica having a size of 100 nm to 1,500 nm may be used. As one preferred example, $SiO_2$ having a size of 140 nm is synthesized, and then grown to 300 nm, or $SiO_2$ having a size of 600 nm is synthesized, and then grown to 1 um to be used. After that, the $SiO_2$ surface is polymer coated, and although the polymer is not particularly limited as long as it is a polymer capable of carbonizing a silica surface, cetyltrimethylammonium bromide (CTAB) and the like may be preferably mixed to a polymer precursor such as resorcinol-formaldehyde. After such polymer coating, a silica-carbon core-shell particle ($SiO_2$@C) may be synthesized by carbonizing for 1 hour to 5 hours at 500° C. to 1000° C. under the $N_2$ atmosphere.

Next, the method for preparing a particle with a yolk-shell structure of the present invention includes (b) reducing a pore size of the carbon shell of the particle formed in (a).

In (b), the silica-carbon core-shell particle may be carbonized after infiltrated with phenol in order to reduce the pore size of the carbon shell.

The amount of the infiltrated phenol may be from 100% to 300% of the pore volume of the silica-carbon core-shell particle ($SiO_2$@C).

A method of carbonizing the silica-carbon core-shell particle ($SiO_2$@C) is not particularly limited as long as it is a method capable of reducing a pore size of a carbon shell, however, the carbonization may be preferably performed using a method of polymerizing for 3 hours at 90° C. using $NH_3$ fume, then, under the nitrogen atmosphere, maintaining a temperature raising rate of 5° C. per minute up to 800° C., and maintaining the temperature for 3 hours when reaching the corresponding temperature.

When capable of reducing a pore size of the carbon shell as in (b), pores of the carbon shell hardly exist unlike existing particles having mesopores in a carbon shell as in FIG. 2, and an electrolyte liquid is difficult to penetrate into the particles, which leads to advantages of enhancing a capacity retention rate and enhancing cycle retaining capacity when used in a battery.

In the particle with a yolk-shell structure of the present invention prepared as above, the particle with a yolk-shell structure may have a micropore particle volume of 0.15 $cm^3/g$ or less, preferably 0.05 $cm^3/g$ or less, more preferably 0.03 $cm^3/g$ or less, and most preferably 0.001 $cm^3/g$ or less.

In addition, in the particle with a yolk-shell structure of the present invention prepared as above, the particle with a yolk-shell structure may have a specific surface area of 600 $m^2/g$ or less, preferably 50 $m^2/g$ to 600 $m^2/g$, and most preferably 50 $m^2/g$ to 120 $m^2/g$.

After that, the method for preparing a particle with a yolk-shell structure of the present invention includes (c) partially etching the silica ($SiO_2$) inside the particle having its pore size reduced in (b).

In (c), the $SiO_2$ is partially etched in order to secure free space required for charge and discharge.

For such partial etching, the silica ($SiO_2$) inside the particle having its pore size reduced in (b) is treated with sodium hydroxide (NaOH) to etch a part of the silica ($SiO_2$) inside the core-shell particle.

By removing a part of the $SiO_2$ through reacting the silica-carbon core-shell particle with sodium hydroxide, free space required for charge and discharge is formed, and this may perform a role of free space preventing the core-shell structure from being broken when volume reduction and expansion occur during a magnesiothermic reduction reaction of the following (d).

After that, the method for preparing a particle with a yolk-shell structure of the present invention includes (d) preparing a particle with a yolk-shell structure through magnesiothermic reduction.

In (d), magnesiothermic reduction is performed to reduce the silica ($SiO_2$) inside the particle.

For this, Si and MgO are produced by reacting the silica ($SiO_2$) inside the silica-carbon core-shell particle (SiOAC) with Mg after (c).

When reacting the $SiO_2$ and Mg as above, Si and MgO are produced by a reduction reaction. Herein, molar numbers of the $SiO_2$ before the reduction and the Si after the reduction are the same, and the reaction may be represented by the following Equation 1.

$$V_{SiO2}*d_{SiO2}/M_{SiO2}=V_{Si}*d_{Si}/M_{Si} \quad \text{(Equation 1)}$$

($d_{SiO2}$: 2.2 g/cm$^3$, $d_{Si}$: 2.33 g/m$^3$, $M_{SiO2}$: 60 g/mol, $M_{Si}$: 28 g/mol)

As the reaction progresses, the Si and MgO volumes become larger than the $SiO_2$ volume by a difference in the density according to Equation 1.

In addition, the produced MgO has a molar number corresponding to twice the $SiO_2$, and the volume after the reaction is $V_{Si}+V_{MgO}$, which is approximately 1.26 times compared to the $SiO_2$. Herein, empty space required for volume expansion needs to be provided by controlling the $SiO_2$ size through sodium hydroxide, and the volume expanding during charge and discharge may be calculated by controlling the volume of the empty space and the volume of the MgO to be removed later through acid treatment to be 3 times of the Si volume.

Through such a method, a maximum $SiO_2$ size required for 300% volume expansion during Si charge and discharge may be obtained, and this is represented by the following Equation 2.

$$3*V_{si}=V_{void}+V_{MgO} \quad (2)$$

In addition, byproducts such as $Mg_2Si$ or SiC are readily produced in the reaction between $SiO_2$@C and Mg in Step 3, and an optimum condition needs to be identified for the reaction.

In order to reduce the production of byproducts such as $Mg_2Si$ or SiC, the equivalent amount of the introduced Mg is preferably 2.5 or less, and the amount of the introduced $SiO_2$@C, needs to be 40 mg or less when the $SiO_2$@C size is from 200 nm to 500 nm, and needs to be 100 mg or less when the $SiO_2$@C size is from 500 nm to 1 um based on one reactor in order to reduce the production of SiC.

In (d), the magnesiothermic reduction reaction may be progressed after sealing a container with a lid in order to prevent the loss of vaporized Mg as much as possible. Specifically, the reaction is progressed at 400° C. to 600° C. with a temperature raising rate of 3° C./min to 7° C./min under the Ar atmosphere. In addition, after the thermic reduction reaction is finished, the remaining MgO may be removed using an acid component, and may preferably be removed using a strong acid such as hydrochloric acid.

After that, the method for preparing a particle with a yolk-shell structure of the present invention includes (e) growing a size of a silicon (Si) particle inside the core through heat treating the particle with a yolk-shell structure magnesiothermic reduced in (d). The concept of e) may be presented as in FIG. 18.

In (e), the size of the silicon (Si) particle inside the core may grow by raising a temperature at a temperature raising rate of 2° C./min to 10° C./min, and performing heat treatment for 12 hours to 36 hours at a temperature of 700° C. to 1200° C.

In the heat treatment of (e), the heat treatment in (e) is preferably progressed at a temperature of 700° C. to 900° C. when the size of the silica ($SiO_2$) used in (a) is greater than or equal to 100 nm and less than 700 nm.

In addition, in the heat treatment of (e), the heat treatment in (e) is preferably progressed at a temperature of 900° C. to 1200° C. when the size of the silica ($SiO_2$) used in (a) is greater than or equal to 700 nm and less than or equal to 1,500 nm. Not satisfying the above-mentioned temperature may cause a problem in the silicon particle growth The size of the silicon (Si) particle grown as above may be 20 nm or greater, preferably from 30 nm to 150 nm, and more preferably from 30 nm to 100 nm. The silicon particle size being less than 20 nm may cause a problem of decreasing first cycle Coulombic efficiency as the specific surface area increases.

In addition, the particle with a yolk-shell structure may have a specific surface area of 150 m$^2$/g or less, preferably 150 m$^2$/g or less, and more preferably 30 m$^2$/g to 100 m$^2$/g. The specific surface area range being greater than 150 m$^2$/g may cause a problem of decreasing first cycle Coulombic efficiency.

Negative Electrode for Lithium Secondary Battery

The particle with a yolk-shell structure provided in the present invention may be preferably used as a negative electrode material of a negative electrode for a lithium secondary battery.

The negative electrode includes a negative electrode active material formed on a negative electrode current collector, and as the negative electrode active material, the particle with a yolk-shell structure prepared according to the present invention is used.

The negative electrode current collector may specifically be selected from the group consisting of copper, stainless steel, titanium, silver, palladium, nickel, alloys thereof and combinations thereof. The stainless steel may be surface treated with carbon, nickel, titanium or silver, and aluminum-cadmium alloys may be used as the alloy. In addition thereto, baked carbon, non-conductive polymers of which surface is treated with a conductor, conductive polymers or the like may also be used.

The negative electrode may further include a binder resin, a conductor, a filler, other additives and the like.

The binder resin is used for binding of the electrode active material and the conductor and for binding on the current collector. Nonlimiting examples of such a binder resin may include polyvinylidene fluoride (PVDF), polyvinyl alcohol (PVA), polyacrylic acid (PAA), polymethacrylic acid (PMA), polymethyl methacrylate (PMMA) polyacrylamide (PAM), polymethacrylamide, polyacrylonitrile (PAN), polymethacrylonitrile, polyimide (PI), alginic acid, alginate, chitosan, carboxymethylcellulose (CMC), starch, hydroxypropylcellulose, regenerated cellulose, polyvinyl pyrrolidone, tetrafluoroethylene, polyethylene, polypropylene, an ethylene-propylene-diene polymer (EPDM), a sulfonated-EPDM, styrene-butadiene rubber (SBR), fluorine rubber, various copolymers thereof and the like.

The conductor is used for further enhancing conductivity of the electrode active material. Such a conductor is not particularly limited as long as it has conductivity with inducing chemical changes to the corresponding battery, and for example, graphite such as natural graphite or artificial graphite; carbon black such as carbon black, acetylene black, ketjen black, channel black, furnace black, lamp black and thermal black; conductive fibers such as carbon fibers or metal fibers; fluorocarbon, aluminum and metal powders such as nickel powder; conductive whiskers such as zinc oxide and potassium titanate; conductive metal oxides such as titanium oxide; polyphenylene derivatives, and the like may be used.

Lithium Secondary Battery

As one embodiment of the present invention, a lithium secondary battery includes the negative electrode described above; a positive electrode; and an electrolyte.

The lithium secondary battery according to the present invention includes a positive electrode, a negative electrode, and a separator and an electrolyte provided therebetween, and includes the particle with a yolk-shell structure prepared according to the present invention as a negative electrode active material.

The particle with a yolk-shell structure prepared according to the present invention may mitigate capacity degeneration caused by silicon volume expansion, and exhibits excellent electrical conductivity and capacity retention rate.

Constitutions of the positive electrode, the negative electrode, the separator and the electrolyte of the lithium secondary battery are not particularly limited in the present invention, and follow constitutions known in the art.

The positive electrode is used including a positive electrode active material formed on a positive electrode current collector, and the positive electrode current collector is not particularly limited as long as it has high conductivity without inducing chemical changes to the corresponding battery, and for example, stainless steel, aluminum, nickel, titanium, baked carbon, or aluminum or stainless steel of which surface is treated with carbon, nickel, titanium, silver or the like may be used. Herein, the positive electrode current collector may use various forms such as films, sheets, foil, nets, porous bodies, foams or non-woven fabrics having micro-unevenness formed on its surface so as to increase adhesive strength with the positive electrode active material.

As the positive electrode active material forming the electrode layer, all positive electrode active materials usable in the art may be used. Specific examples of such a positive electrode active material may include lithium cobalt-based oxides such as $LiCoO_2$; lithium manganese-based oxides such as $Li_{1+x}Mn_{2-x}O_4$ (herein, x is from 0 to 0.33), $LiMnO_3$, $LiMn_2O_3$ or $LiMnO_2$; lithium copper oxides such as $Li_2CuO_2$; vanadium oxide such as $LiV_3O_8$, $LiFe_3O_4$, $V_2O_5$ or $Cu_2V_2O_7$; lithium nickel-based oxides represented by $LiNi_{1-x}M_xO_2$ (herein, M=Co, Mn, Al, Cu, Fe, Mg, B or Ga, and x=0.01 to 0.3); lithium manganese composite oxides represented by $LiMn_{2-x}MxO_2$ (herein, M=Co, Ni, Fe, Cr, Zn or Ta, and x=0.01 to 0.1) or $Li_2Mn_3MO_8$ (herein, M=Fe, Co, Ni, Cu or Zn); lithium-nickel-manganese-cobalt-based oxides represented by $Li(Ni_aCo_bMn_c) O_2$ (herein, 0<a<1, 0<b<1, 0<c<1, and a+b+c=1); vanadium oxides such as $LiV_3O_8$, $LiFe_3O_4$, $V_2O_5$ or $Cu_2V_2O_7$; sulfur or disulfide compounds; phosphates such as $LiFePO_4$, $LiMnPO_4$, $LiCoPO_4$ or $LiNiPO_4$; $Fe_2(MoO_4)_3$ and the like, but are not limited thereto.

Herein, the electrode layer may further include, in addition to the positive electrode active material, a binder resin, a conductor, a filler, other additives and the like.

The binder resin is used for binding of the electrode active material and the conductor and for binding on the current collector. Nonlimiting examples of such a binder resin may include polyvinylidene fluoride (PVDF), polyvinyl alcohol (PVA), polyacrylic acid (PAA), polymethacrylic acid (PMA), polymethyl methacrylate (PMMA) polyacrylamide (PAM), polymethacrylamide, polyacrylonitrile (PAN), polymethacrylonitrile, polyimide (PI), alginic acid, alginate, chitosan, carboxymethylcellulose (CMC), starch, hydroxypropylcellulose, regenerated cellulose, polyvinyl pyrrolidone, tetrafluoroethylene, polyethylene, polypropylene, an ethylene-propylene-diene polymer (EPDM), a sulfonated-EPDM, styrene-butadiene rubber (SBR), fluorine rubber, various copolymers thereof and the like.

The conductor is used for further enhancing conductivity of the electrode active material. Such a conductor is not particularly limited as long as it has conductivity with inducing chemical changes to the corresponding battery, and for example, graphite such as natural graphite or artificial graphite; carbon black such as carbon black, acetylene black, ketjen black, channel black, furnace black, lamp black and thermal black; conductive fibers such as carbon fibers or metal fibers; fluorocarbon, aluminum and metal powders such as nickel powder; conductive whiskers such as zinc oxide and potassium titanate; conductive metal oxides such as titanium oxide; polyphenylene derivatives, and the like may be used.

As the negative electrode, the negative electrode of the present invention described above may be used.

The separator may be formed with a porous base, and as the porous base, porous bases commonly used in electrochemical devices may all be used. Examples thereof may include polyolefin-based porous membranes or non-woven fabrics, but are not limited thereto.

The separator may be a porous base formed with any one selected from the group consisting of polyethylene, polypropylene, polybutylene, polypentene, polyethylene terephthalate, polybutylene terephthalate, polyester, polyacetal, polyamide, polycarbonate, polyimide, polyetheretherketone, polyether sulfone, polyphenylene oxide, polyphenylene sulfide and polyethylene naphthalate, or a mixture of two or more types thereof.

The electrolyte liquid of the lithium secondary battery is, as a lithium salt-containing non-aqueous electrolyte liquid, formed with a lithium salt and a solvent, and as the solvent, non-aqueous organic solvents, organic solid electrolytes, inorganic solid electrolytes and the like are used.

The lithium salt is a material to be favorably dissolved in the non-aqueous electrolyte liquid, and examples thereof may include LiCl, LiBr, LiI, $LiClO_4$, $LiBF_4$, $LiB_{10}Cl_{10}$, $LiPF_6$, $LiAsF_6$, $LiSbF_6$, $LiAlCl_4$, LiSCN, $LiC_4BO_3$, $LiCF_3CO_2$, $LiCH_3SO_3$, $LiCF_3SO_3$, $LiN(SO_2CF_3)_2$, $LiN(SO_2C_2F_5)_2$, $LiC_4F_9SO_3$, $LiC(CF_3SO_2)_3$, $(CF_3SO_2).2NLi$, chloroborane lithium, lower aliphatic carboxylic acid lithium, lithium tetraphenylborate, lithium imide and the like.

Examples of the non-aqueous organic solvent may include aprotic organic solvents such as N-methyl-2-pyrrolidinone, propylene carbonate, ethylene carbonate, butylene carbonate, dimethyl carbonate, diethyl carbonate, ethylmethyl carbonate, gamma-butyrolactone, 1,2-dimethoxyethane, 1,2-diethoxyethane, tetrahydroxy franc, 2-methyltetrahydrofuran, dimethyl sulfoxide, 1,3-dioxolane, 4-methyl-1,3-dioxene, diethyl ether, formamide, dimethylformamide, dioxolane, acetonitrile, nitromethane, methyl formate, methyl acetate, phosphoric acid triester, trimethoxymethane, dioxolane derivatives, sulfolane, methylsulfolane, 1,3-dimethyl-2-imidazolidinone, propylene carbonate derivatives, tetrahydrofuran derivatives, ether, methyl propionate or ethyl propionate.

As the organic solid electrolyte, for example, polyethylene derivatives, polyethylene oxide derivatives, polypropylene oxide derivatives, phosphoric acid ester polymers, polyagitation lysine, polyester sulfide, polyvinyl alcohol, polyvinylidene fluoride, polymers including an ionic dissociation group, and the like may be used.

As the inorganic solid electrolyte, for example, nitrides, halides, sulfates and the like of Li such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH or $Li_3PO_4$—$Li_2S$—$SiS_2$ may be used.

In addition, with the purpose of improving charge and discharge properties, flame retardancy and the like, the non-aqueous electrolyte liquid may further include other additives. Examples of the additive may include pyridine, triethylphosphite, triethanolamine, cyclic ether, ethylenediamine, n-glyme, hexaphosphoric acid triamide, nitrobenzene derivatives, sulfur, quinoneimine dyes, N-substituted oxazolidinone, N,N-substituted imidazolidine, ethylene glycol dialkyl ether, ammonium salts, pyrrole, 2-methoxyethanol, aluminum trichloride, fluoro-ethylene carbonate (FEC), propene sultone (PRS), vinylene carbonate (VC) and the like.

The lithium secondary battery according to the present invention may go through lamination (stack) and folding processes of a separator and an electrode in addition to winding, a general process. In addition, the battery case may be a cylinder-type, a square-type, a pouch-type, a coin-type or the like.

Hereinafter, preferred examples are provided in order to illuminate the present invention, however, the following examples are for illustrative purposes only, and it is obvious to those skilled in the art that various changes and modifications may be made within the category and technological ideas of the present invention, and such changes and modifications also fall within the scope of the attached claims.

EXAMPLE

Preparation of Silicon-Carbon Composite

Example 1

Step 1: Synthesis of SiOAC

After synthesizing $SiO_2$ having an average particle size of 140 nm using a stober method, the 140 nm $SiO_2$ was grown to 300 nm. The prepared 300 nm $SiO_2$ was photographed using a scanning electron microscope (SEM), and this is shown in FIG. 3.

After that, 0.5 g of the $SiO_2$ was dispersed into 380 mL of water, then 5 mL of 7.5 mM cetyltrimethylammonium bromide (CTAB) was introduced thereto, and after sufficiently mixing the result, 0.2 mL of ammonia was introduced thereto. After that, a solution mixing 200 mg of resorcinol and 0.2 mL of formaldehyde with 5 mL of water was added thereto, and the result was reacted for 24 hours for polymer coating.

After that, the $SiO_2$@polymer composite was carbonized for 3 hours at a temperature of 800° C. under the $N_2$ atmosphere to synthesize a $SiO_2$@C core-shell structure.

In addition, a result of Raman pattern analysis on the prepared 300 nm $SiO_2$@C core-shell is shown in FIG. 4.

A micropore volume of the prepared $SiO_2$@C core-shell was measured, and the results are shown in Table 5 to describe later.

Step 2: Pore Block Process

A pore blocking process for reducing a pore size of the carbon of the prepared $SiO_2$@C core-shell was progressed.

To the prepared $SiO_2$@C core-shell, phenol corresponding to 150% of the pore volume was infiltrated. After that, the result was polymerized for 3 hours at 90° C. using $NH_3$ fume, and, under the nitrogen atmosphere, carbonization was progressed by maintaining a temperature raising rate of 5° C. per minute up to 800° C., and maintaining the temperature for 3 hours when reaching the corresponding temperature.

Step 3: Partial Etching Process

The $SiO_2$ was partially etched in order to secure free space required for charge and discharge.

For the partial etching, sodium hydroxide (NaOH) was added to the $SiO_2$@C core-shell prepared in Step 2. By adding sodium hydroxide as above, a part of the silica ($SiO_2$) inside the $SiO_2$@C core-shell was etched, and empty space was formed inside the $SiO_2$@C core-shell therethrough.

Such empty space formation may perform a role of free space preventing the core-shell structure from being broken when volume reduction and expansion occur during a magnesiothermic reduction reaction of the following Step 4.

Step 4: Magnesiothermic Reduction

On the $SiO_2$@C core-shell prepared in Step 3, magnesiothermic reduction was progressed using a method of vaporizing magnesium through a gas solid reaction in a w24×L32×h17 mm-sized alumina reactor with a lid, and then reacting the result with the $SiO_2$@C core-shell. Herein, the equivalent amount of the introduced Mg was 1.5, 2.0 and 2.5, and the amount of the introduced $SiO_2$@C was 30 mg, 40 mg and 50 mg.

The reaction was progressed in an alumina boat with a lid while blocking the gap using gypsum in order to prevent the loss of vaporized Mg as much as possible, and specifically, the thermic reduction reaction was progressed at 600° C. with a temperature raising rate of 5° C./min under the Ar atmosphere.

After finishing the thermic reduction reaction, the remaining MgO was removed using HCl, and finally, a Si@C composite with a yolk-shell structure was obtained.

First, production of byproducts depending on the equivalent amount of the introduced Mg was identified.

TABLE 1

| | Equivalent Amount of Introduced Mg | Weight of Introduced $SiO_2$@C (mg) | Result |
| --- | --- | --- | --- |
| Experiment 1 | 1.5 | 30 | $Mg_2Si$ Production Not Identified |
| Experiment 2 | 2.0 | 30 | $Mg_2Si$ Production Not Identified |
| Experiment 3 | 2.5 | 30 | $Mg_2Si$ Production Identified |

As in Table 1, production of byproducts was identified when the equivalent amount of Mg was 2.5 or greater.

Next, production of byproducts depending on the weight of the introduced $SiO_2$@C was identified.

TABLE 2

| | Equivalent Amount of Introduced Mg | Weight of Introduced $SiO_2$@C (mg) | Result |
| --- | --- | --- | --- |
| Experiment 4 | 2.0 | 30 | SiC Production Not Identified |
| Experiment 5 | 2.0 | 40 | SiC Production Not Identified |
| Experiment 6 | 2.0 | 50 | SiC Production Identified |

The SiC is a thermodynamically stable material produced at an interface between $SiO_2$ and C, and heat is generated when $SiO_2$ is reduced to Si. As shown in Table 2, it was seen that SiC production dominated as the sample amount increased since the amount of heat generated increased.

In addition, the prepared Si@C composite with a yolk-shell structure was photographed using a transmission electron microscope (TEM), and the results are shown in FIG. 5 and FIG. 6.

Through the transmission electron microscope measurements of FIG. 5 and FIG. 6, it was identified that, unlike Comparative Example 1 of FIG. 10, a graphitic layer and a porous Si structure were produced in the carbon shell after the reaction of Mg as the Si@C with a yolk-shell structure was synthesized using a magnesium reaction in Example 1.

In addition, in order to examine physical changes in the carbon after the magnesium reaction, a Raman pattern analysis was performed on the Si@C composite with a yolk-shell structure prepared above, and the results are shown in FIG. 7, and an X-ray diffraction analysis (XRD) was progressed in the same manner, and the results are shown in FIG. 8.

Through comparing the results of Raman spectrum analyses, it was identified that the Si@C composite of FIG. 7 exhibited a graphitic property of carbon better compared to the $SiO_2$@C composite of FIG. 4 ($I_D/I_G$: 1.01→0.95).

Step 5: Additional Heat Treatment Process

The Si@C-structured yolk-shell material prepared in Step 4 was reacted for 24 hours after reaching 800° C. by raising a temperature with a temperature raising rate of 5° C./min under the Ar atmosphere.

An X-ray diffraction (XRD) analysis was progressed on the yolk-shell before the heat treatment (Comparative Example 1) and after the heat treatment (Example 1) in Step 5, and the results are shown in FIG. 19.

The black graph shows the result of the XRD analysis on the yolk-shell particle before the heat treatment, and the blue graph shows the result of the XRD analysis on the yolk-shell particle after the heat treatment. Through FIG. 19, it was seen that the Si crystal size increased from 16.1 nm to 31.4 nm.

Example 2

Step 1: Synthesis of $SiO_2$@C

Preparation was made in the same manner as in Example 1 except that $SiO_2$ having an average particle size of 600 nm was used and grown to 1 μm instead of using $SiO_2$ having an average particle size of 140 nm. The prepared 1 μm $SiO_2$ was photographed using a scanning electron microscope (SEM), and the result is shown in FIG. 12.

Step 2: Pore Block Process

Preparation was made in the same manner as in Example 1.

Step 3: Partial Etching Process

Preparation was made in the same manner as in Example 1.

Step 4: Magnesiothermic Reduction

Preparation was made in the same manner as in Example 1 except that the amount of the introduced $SiO_2$ was 50 mg, 100 mg and 110 mg.

In addition, the prepared Si@C yolk shell was photographed using a transmission electron microscope (TEM), and the result is shown in FIG. 13.

As in Example 1, production of byproducts depending on the equivalent amount of the introduced Mg and the weight of the introduced $SiO_2$@C was identified.

First, production of byproducts depending on the equivalent amount of the introduced Mg was identified.

TABLE 3

| | Equivalent Amount of Introduced Mg | Weight of Introduced $SiO_2$@C (mg) | Result |
|---|---|---|---|
| Experiment 7 | 1.5 | 50 | $Mg_2Si$ Production Not Identified |
| Experiment 8 | 2.0 | 50 | $Mg_2Si$ Production Not Identified |
| Experiment 9 | 2.5 | 50 | $Mg_2Si$ Production Identified |

As in Table 3, production of $Mg_2Si$ was identified when the equivalent amount of Mg was 2.5 or greater.

Next, production of byproducts depending on the weight of the introduced $SiO_2$@C was identified.

TABLE 4

| | Equivalent Amount of Introduced Mg | Weight of Introduced $SiO_2$@C (mg) | Result |
|---|---|---|---|
| Experiment 10 | 2.0 | 50 | SiC Production Not Identified |
| Experiment 11 | 2.0 | 100 | SiC Production Not Identified |
| Experiment 12 | 2.0 | 110 | SiC Production Identified |

As shown in Table 4, it was also seen in Example 2 that SiC production dominated as the sample amount increased since the amount of heat generated increased.

Step 5: Additional Heat Treatment Process

The Si@C-structured yolk-shell material prepared in Step 4 was reacted for 24 hours after reaching 1000° C. by raising a temperature with a temperature raising rate of 5° C./min under the Ar atmosphere.

An X-ray diffraction (XRD) analysis was progressed on the yolk-shell before the heat treatment (Comparative Example 2) and after the heat treatment (Example 2) in Step 5, and the results are shown in FIG. 20.

The black graph shows the result of the XRD analysis on the yolk-shell particle before the heat treatment, and the blue graph shows the result of the XRD analysis on the yolk-shell particle after the heat treatment. Through FIG. 20, it was seen that the Si crystal size increased from 17.1 nm to 30.0 nm.

Comparative Example 1

Step 1 to Step 3

After synthesizing 140 nm $SiO_2$ in the same manner as in the Example described above, 200 nm $SiO_2$ was synthesized through a growth method. After that, 3 g of the $SiO_2$ was ultrasonic dispersed into a solution mixing 108 g of EtOH and 224 g of DI water, and 1.11 g of CTAB was further introduced and dissolved therein. The result was stirred for 10 minutes, 3 g of ammonia and 2 g of TEOS were introduced thereto, and the result was reacted for 16 hours to additionally synthesize a shell having 2 nm mesopores on the existing $SiO_2$ surface. After the reaction, the result was purified using EtOH, and after drying the material, CTAB in the pores was removed through calcination for 5 hours at 700° C. in a box furnace. In order to introduce a polymer that becomes a precursor of carbon to the synthesized material, 2 g of $AlCl_3 6H_2O$ per 2 g of $SiO_2$@$mSiO_2$ was dispersed into a mixed solution of 20 mL of DI water and 20 mL of EtOH for 2 hours through ultrasonic dispersion. Herein, Al was doped on the pores of the $SiO_2$@$mSiO_2$, and a polymer reaction was progressed utilizing this as a catalytic site. Per 200 mg of the synthesized Al—$SiO_2$@$mSiO_2$, 95 mg of phenol and 100 mg of paraformaldehyde were used. After introducing the Al—$SiO_2$@$mSiO_2$ material to a sealable container by being spread widely, phenol and para-formaldehyde were each placed in a small plastic or aluminum container, and introduced to the container including the Al—$SiO_2$@$mSiO_2$. After sealing the container, the result was reacted for 12 hours in a 100° C. oven, and then carbonized for 3 hours at 800° C. under the nitrogen atmosphere. The phenol and the para-formaldehyde were vaporized at a temperature of 80° C. or higher resulting in a regioselective polymer reaction at the Al catalytic site, which made selective polymer synthesis possible inside the pores. After that, a $SiO_2$@mC material was synthesized by progressing a partial etching process in the same manner as in Example 1.

The $SiO_2$ produced in the comparative example was photographed using a scanning electron microscope (SEM), and the result is shown in FIG. 9.

Step 4: Magnesiothermic Reduction

A reduction process was progressed as disclosed in "J. Phys. Chem. C 2015, 119, 10255", an existing technology.

Specifically, $SiO_2$@C and an excess amount of Mg were used ($SiO_2$:Mg=1:4 mol ratio) in order to prevent SiC production, and $Mg_2Si$ was reduced to Si using a $H_2$/Ar gas mixture.

As above, magnesiothermic reduction using an existing carbon-silicon composite may produce SiC (silicon carbide) thermodynamically stable compared to Si.

In addition, the prepared Si@mC composite with a core shell structure was photographed using a transmission electron microscope (TEM), and the results are shown in FIG. 10 and FIG. 11.

Comparative Example 2

Preparation was progressed in the same manner as in Example 1 except that Step 5 was not included.

Comparative Example 3

Preparation was progressed in the same manner as in Example 2 except that Step 5 was not included.

Experimental Example 1

Evaluation on Composite Properties (Pore Structure Comparison)

Pore structures of the $SiO_2$@C prepared in Example 1 and the $SiO_2$@mC (yolk-shell structure having 2 nm to 3 nm mesopores) prepared in Comparative Example 1 were measured using BEL mini nitrogen adsorption equipment manufactured by BEL.

In addition, nitrogen adsorption experiments were progressed on a specific surface area ($S_{BET}$), a total volume ($V_{tot}$) and a pore volume ($V_{micro}$) of the $SiO_2$@C, the $SiO_2$@mC and the Si@mC using BEL mini nitrogen adsorption equipment manufactured by BEL, the results were measured, and shown in the following Table 5.

TABLE 5

| Subject | $S_{BET}$ (m²/g) | $V_{tot}$ (cm³/g) | $V_{micro}$ (cm³/g) |
|---|---|---|---|
| $SiO_2$@mC | 711 | 0.956 | 0.180 |
| $SiO_2$@C | 124.7 | 0.06 | 0.046 |
| Si@C | 116 | 0.53 | 0 |

Through Table 5, it was identified that, by synthesizing the Si@C composite with a yolk-shell structure using a magnesium reaction, the micropore volume of the $SiO_2$@C material before and after the magnesium reaction was reduced after the reaction (0.046 cm³/g→0.0 cm³/g), and through this, it was seen that the pore structure of the amorphous carbon changed.

For the yolk-shell structures prepared in Examples 1 and 2 and Comparative Examples 2 and 3, the specific surface area and the particle size were measured, and the results are shown in the following Table 6.

As for the specific surface area, nitrogen adsorption experiments were progressed using BEL mini nitrogen adsorption equipment manufactured by BEL, the results were measured, and shown in the following Table 6.

In addition, the particle size means an average size that measures diameters of approximately 100 particles using the images obtained through the SEM analyses. This is shown in Table 6.

TABLE 6

| Subject | $S_{BET}$ (m²/g) | Si Particle Size (nm) (Crystal Size) |
|---|---|---|
| Comparative Example 2 (300 nm Si@C)) | 116 | 16.1 |
| Example 1 (300 nm Si@C_heat) | 70 | 31.47 |
| Comparative Example 3 (1 μm Si@C) | 180 | 17.1 |
| Example 2 (1 μm Si@C_heat) | 131 | 30 |

Through Table 6, it was seen that the Si particle size in the Si@C composite with a yolk-shell structure was grown through additional heat treatment.

Experimental Example 2-1

Manufacture of Battery Using Silicon-Carbon Composite (Manufacture of Battery Using Silicon-Carbon Composite)

A battery was manufactured using each of the Si@C composites prepared in Example 1 and Comparative Example 1 as a negative electrode active material.

First, the Si@C prepared in each of Example 1 and Comparative Example 1: binder (polyamide imide (PAI)): conductor (Super-P) were mixed in a weight ratio of 6:2:2, and NMP was used as a solvent to prepare slurry.

The prepared slurry was coated on copper (Cu) foil to a thickness of 40 um using a doctor blade, and in order to increase the binder effect of PAI, heat treatment was performed for 1.5 hours at 350° C. under the Ar atmosphere to prepare a negative electrode.

After that, as for a half-cell in Example 1, a coin 2032 type cell was used, EC:DEC were mixed in 30:70 vol % as an electrolyte liquid, FEC 10 wt % was used as an additive, and a 1.3 M $LiPF_6$ composition was used as a lithium salt to manufacture a half-cell.

In addition, in Comparative Example 1, a coin 2016 type cell was used as a half-cell, EC:DEC:FEC were mixed in 5:70:25 vol % as an electrolyte liquid, and a 1.5 M $LiPF_6$ composition was used as a lithium salt.

Experimental Example 2-2

Evaluation on Battery Properties (Method of Capacity Property Experiment and Rate-Limiting Property Experiment of Example 1)

As for a capacity property experiment, experiments were progressed under a condition of 0.01 V to 1.5 V and 0.1 C at a first cycle, and 0.01 V to 1.0 V and 0.1 C at a second cycle, and from a third cycle after that, experiments were progressed under a condition of 0.01 V to 1.0 V and 0.5 C in order to produce a stable SEI layer. Herein, a 0.02 C cut off current was used in all the cycles.

A rate-limiting property experiment was all the same as the cycle properties, and progressed under a condition of 0.2 C, 0.5 C, 1 C, 2 C and 5 C for 5 cycles each at a third cycle.

(Method of Capacity Property Experiment and Rate-Limiting Property Experiment of Comparative Example 1)

A capacity property experiment and a rate-limiting property experiment were progressed as disclosed in "J. Phys. Chem. C 2015, 119, 10255", an existing technology.

Specifically, the capacity property experiment was progressed under a condition of 0.01 V to 1.5 V and 400 mA/g.

The rate-limiting property experiment and the cycle property were all progressed under a condition of 400 mA/g, 800 mA/g, 1600 mA/g and 3200 mA/g for 10 cycles each.

Results of the capacity property experiment and the rate-limiting property experiment performed on the battery manufactured in Comparative Example 2 and Example 1 are shown in FIG. 14 and FIG. 15, respectively, and results of the capacity property experiment and the rate-limiting property experiment performed on the battery manufactured in Comparative Example 3 and Example 2 are shown in FIG. 16 and FIG. 17, respectively.

In addition, properties of the battery manufactured in Example 1 and the battery manufactured in Comparative Example 1 were compared, and the results are shown in Table 7.

TABLE 7

| | Crystal Size[1] | 1st Cycle CE | Capacity Retention Rate[2] | Cacpcity[3] | 2 C Capacity Retention Rate[4] | Thickness During Charge and Discharge[6] |
|---|---|---|---|---|---|---|
| Comparative Example 1 (Si@mC) | 16.3 | 45 | 82.9 | 896 | 25.6 | — |
| Example 1 (Si@C) | 16.1 | 70 | 96.5 | 1390 | 97.5 | 67->73 (9%) |

([1] unit was nm
[2] based on @50 cycle
[3] based on @50cycle (mAh/g)
[4] with respect to 0.5 C
[5] unit was um. Based on @50 cycle (discharge)
[6] unit was um. Based on @50 (discharge) vs 51 (charge) cycle)

Through Table 7, it was identified that, when using Example 1 of the present invention, a rate-limiting property of high efficiency depending on physical properties of carbon and material structures was obtained.

Particularly, 2 C capacity retention rate was 97.5% with respect to 0.5 C, which was significantly different compared to Comparative Example 1 that was 25.6%, and this is expected to be caused by graphitic physical properties of carbon and a mesoporous structure of Si of the present invention.

In addition, as for the changes in the electrode thickness caused by the yolk shell structure, it was identified that, in the present invention, the electrode thickness when discharging after a 50$^{th}$ cycle and the electrode thickness when charging at a 51$^{st}$ cycle had a 9% increase.

In the Si@C composite with a yolk shell structure prepared by Example 1 of the present invention, it was seen that local heating was generated through magnesiothermic reduction, an exothermic reaction, and noncrystalline carbon changed to graphitic carbon at a high temperature, which reduced porosity and increased electrical properties. Through this, it was seen to have a positive effect on electrochemical properties when used in a battery.

On the other hand, in the Si@mC composite prepared by Comparative Example 1, it was seen that porosity increased by the use of carbon having a relatively large pore size, which resultantly smoothed electrolyte penetration and declined electrochemical performance.

Experimental Example 3

Manufacture of Battery Using Silicon-Carbon Composite and Property Evaluation (Manufacture of Battery Using Silicon-Carbon Composite)

A battery was manufactured using each of the Si@C composites prepared in Example 1, Example 2, Comparative Example 2 and Comparative Example 3 as a negative electrode active material.

First, the Si@C prepared in each of Example 1, Example 2, Comparative Example 2 and Comparative Example 3: binder (polyamide imide (PAI)):conductor (Super-P) were mixed in a weight ratio of 6:2:2, and NMP was used as a solvent to prepare slurry.

The prepared slurry was coated on copper (Cu) foil to a thickness of 40 um using a doctor blade, and in order to increase the binder effect of PAI, heat treatment was performed for 1.5 hours at 350° C. under the Ar atmosphere to prepare a negative electrode.

After that, as for a half-cell, a coin 2032 type cell was used, EC:DEC were mixed in 30:70 vol % as an electrolyte liquid, FEC 10 wt % was used as an additive, and a 1.3 M LiPF$_6$ composition was used as a lithium salt to manufacture a half-cell.

(Method of Capacity Property Experiment and Rate-Limiting Property Experiment)

1) As for a capacity property experiment, experiments were progressed under a condition of 0.01 V to 1.5 V and 0.1 C at a first cycle, and 0.01 V to 1.0 V and 0.1 C at a second cycle, and from a third cycle after that, experiments were progressed under a condition of 0.01 V to 1.0 V and 0.5 C in order to produce a stable SEI layer. Herein, a 0.02 C cut off current was used in all the cycles.

2) A rate-limiting property experiment was all the same as the cycle properties, and progressed under a condition of 0.2 C, 0.5 C, 1 C, 2 C and 5 C for 5 cycles each at a third cycle.

Results of the capacity property experiment and the rate-limiting property experiment performed on the battery using each of the composites prepared in Example 1 and Comparative Example 2 are shown in FIG. 15 and FIG. 14, respectively, and results of the capacity property experiment and the rate-limiting property experiment performed on the battery using each of the composites prepared in Example 2 and Comparative Example 3 are shown in FIG. 17 and FIG. 16, respectively.

In addition, properties of Examples 1 and 2, and Comparative Examples 2 and 3 were compared, and the results are shown in Table 8.

TABLE 8

| | 1st Cycle CE | Capacity Retention Rate[2] | Cacpcity[3] | 2 C Capacity Retention Rate[4] | Change in Thickness[5] | Thickness During Charge and Discharge[6] |
|---|---|---|---|---|---|---|
| Comparative Example 2 (300 nm Si@C) | 70 | 96.5 | 1390 | 97.5 | 45->58 (28%) | 67->73 (9%) |
| Example 1 (300 nm Si@C_heat) | 75 | 94 | 1257 | 92.4 | 43->53 (23%) | 53->56 (5%) |
| Comparative Example 3 (1 μm Si@C) | 60 | 97 | 997 | 93 | 48->57 um (18%) | 57->62 (9%) |
| Example 2 (1 μm Si@C_heat) | 65 | 93 | 1290 | — | 43->55 (28%) | 55->59 (7%) |

(1: unit was nm
[2]based on @50 cycle
[3]based on @50cycle (mAh/g)
[4]with respect to 0.5 C
[5]unit was um. Based on @50 cycle (discharge)
[6]unit was um. Based on @50 (discharge) vs 51 (charge) cycle)

When examining FIG. 14 to FIG. 17, and Table 8, Coulombic efficiency at the first cycle was 70% in the battery using the composite prepared in Comparative Example (300 nm Si@C), and 60% in the battery using the composite prepared in Comparative Example 2 (1 um Si@C).

When examining the results of the batteries using the composites prepared in Example 1 and Example 2 increasing a Si crystal size through heat treatment and progressing a process decreasing a specific surface area with respect to the batteries using the composites prepared in Comparative Examples 2 and 3, it was seen that first cycle Coulombic efficiency increased by approximately 5% regardless of the yolk-shell structure size.

In addition, it was identified that the electrode thickness when discharging after the 50$^{th}$ cycle increased by approximately 20% when compared with the electrode thickness before the cycle, and it was identified that a difference between the electrode thickness when discharging after the 50$^{th}$ cycle and the electrode thickness when charging at the 51$^{st}$ cycle increased by less than 10%. Through this, it was seen that changes in the battery volume caused by volume expansion, a disadvantage of existing silicon negative electrode materials, were minimized, and as a result, stable results were obtained in charge and discharge capacity as well.

The invention claimed is:

1. A particle with a yolk-shell structure comprising:
   a shell comprising carbon; and
   a core comprising a plurality of silicon nanoparticles provided inside the shell each having an average particle size of 20 nm to 31.4 nm,
   wherein at least a part of the shell is spaced apart from the core, and
   the shell of the particle with the yolk-shell structure has a micropore volume of 0.15 cm$^3$/g or less,
   wherein the shell has a mesopore size of 2 nm or less.

2. The particle with the yolk-shell structure of claim 1, wherein the micropore volume is 0.05 cm$^3$/g or less.

3. The particle with the yolk-shell structure of claim 1, wherein the micropore volume is 0.001 cm$^3$/g or less.

4. The particle with the yolk-shell structure of claim 1, which has a specific surface area of 600 m$^2$/g or less.

5. The particle with the yolk-shell structure of claim 1, which has a specific surface area of 50 m$^2$/g to 120 m$^2$/g.

6. A negative electrode for a lithium secondary battery comprising the particle with a yolk-shell structure of claim 1.

7. A lithium secondary battery comprising:
   the negative electrode of claim 6;
   a positive electrode; and
   an electrolyte.

* * * * *